(12) United States Patent
Antia et al.

(10) Patent No.: US 9,264,675 B2
(45) Date of Patent: Feb. 16, 2016

(54) SYSTEM AND METHOD FOR MULTI-CARRIER MULTIPLEXING

(75) Inventors: Yezdi Antia, North Potomac, MD (US); Dave Roos, Boyds, MD (US); Neal Becker, Frederick, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 755 days.

(21) Appl. No.: 13/323,467

(22) Filed: Dec. 12, 2011

(65) Prior Publication Data

US 2012/0121023 A1  May 17, 2012

Related U.S. Application Data

(63) Continuation-in-part of application No. 13/086,702, filed on Apr. 14, 2011, now abandoned.

(60) Provisional application No. 61/324,085, filed on Apr. 14, 2010.

(51) Int. Cl.
*H04L 12/54* (2013.01)
*H04N 7/20* (2006.01)

(52) U.S. Cl.
CPC .................................. *H04N 7/20* (2013.01)

(58) Field of Classification Search
CPC ................................ H04N 7/20; H04L 12/54
USPC ........................ 375/240.24, E7.027
See application file for complete search history.

(56) References Cited

U.S. PATENT DOCUMENTS

| | | | | |
|---|---|---|---|---|
| 5,337,313 A * | 8/1994 | Buchholz | ........... | H04Q 11/0478 370/394 |
| 6,308,280 B1 * | 10/2001 | Joseph | ................ | H04H 40/90 348/E5.002 |
| 6,618,450 B1 * | 9/2003 | Hatta | ................ | H04L 1/0054 375/340 |
| 6,704,898 B1 * | 3/2004 | Furuskar | ............. | H04L 1/1819 714/749 |
| 7,117,418 B2 * | 10/2006 | Thesling | ............ | H03M 13/2963 714/755 |
| 7,180,873 B1 * | 2/2007 | Monte | .................... | H04B 7/204 370/325 |
| 7,190,681 B1 * | 3/2007 | Wu | .................... | H04L 12/5601 370/316 |
| 7,907,641 B2 * | 3/2011 | Sun | ................... | H03M 13/1165 370/522 |
| 2003/0053492 A1 * | 3/2003 | Matsunaga | ............ | H04H 20/06 370/537 |

(Continued)

OTHER PUBLICATIONS

Digital Video Broadcasting (DVB); Second generation framing structure, channel coding and modulation systems for Broadcasting_ETSI EN 302 307 V1.2.1.*

*Primary Examiner* — Khaled Kassim
*Assistant Examiner* — Berhanu Belete
(74) *Attorney, Agent, or Firm* — Potomac Technology Law, LLC

(57) ABSTRACT

A system for a multiplexing scheme for wideband signals in a communications system is provided. A codeblock of a multiplexed datastream is decoded. The codeblock includes a flag indicating whether the codeblock contains a timeplan, signifying a multiplexing structure of the datastream. A determination is made whether the flag indicates the presence of the timeplan, and, if so, the timeplan is acquired. In response to a determination that the codeblock does not contain the timeplan, a subsequent codeblock is determined, and decoded. Each codeblock includes an indicator of a sequence position of the codeblock within a group of codeblocks of the datastream. The subsequent codeblock is determined based on one or more of a decode rate of the processor device and the sequence position indicator. A determination is made whether the flag of the subsequent codeblock indicates the presence of the timeplan, and, if so, the timeplan is acquired.

41 Claims, 15 Drawing Sheets

(56) References Cited

U.S. PATENT DOCUMENTS

| | | | | |
|---|---|---|---|---|
| 2003/0235147 | A1* | 12/2003 | Walton | H04B 7/04 370/204 |
| 2005/0071877 | A1* | 3/2005 | Navarro | H04H 40/90 725/68 |
| 2005/0089068 | A1* | 4/2005 | Sun | H03M 13/1165 370/509 |
| 2005/0141475 | A1* | 6/2005 | Vijayan | H04W 4/06 370/345 |
| 2006/0126576 | A1* | 6/2006 | Dale | H04B 7/18584 370/336 |
| 2006/0130113 | A1* | 6/2006 | Carlucci | H04N 7/17318 725/118 |
| 2006/0182193 | A1* | 8/2006 | Monsen | H04L 25/03057 375/267 |
| 2006/0245355 | A1* | 11/2006 | Iwamura | H04L 12/5695 370/232 |
| 2006/0285481 | A1* | 12/2006 | Lane | G06Q 50/22 370/208 |
| 2007/0258466 | A1* | 11/2007 | Kakani | H04L 1/1614 370/395.53 |
| 2008/0066095 | A1* | 3/2008 | Reinoso | H04N 7/1675 725/28 |
| 2008/0123560 | A1* | 5/2008 | Nassor | H04L 1/0017 370/255 |
| 2009/0080505 | A1* | 3/2009 | Geile | G06F 17/14 375/222 |
| 2009/0122874 | A1* | 5/2009 | Kolze | H04N 20/69 375/240.24 |
| 2009/0135929 | A1* | 5/2009 | Yamasuge | H04L 27/0012 375/260 |
| 2009/0168773 | A1* | 7/2009 | Crookes | H04N 21/23608 370/389 |
| 2009/0175210 | A1* | 7/2009 | Vijayan | H04L 1/0065 370/312 |
| 2009/0268660 | A1* | 10/2009 | Agarwal | H04L 1/0041 370/316 |
| 2010/0208666 | A1* | 8/2010 | Frederiksen | H04W 72/0406 370/329 |
| 2010/0265865 | A9* | 10/2010 | Vijayan | H04B 7/12 370/312 |
| 2010/0269147 | A1* | 10/2010 | Zetterower | H04N 5/782 725/114 |
| 2011/0090958 | A1 | 4/2011 | Sridhar et al. | |

* cited by examiner

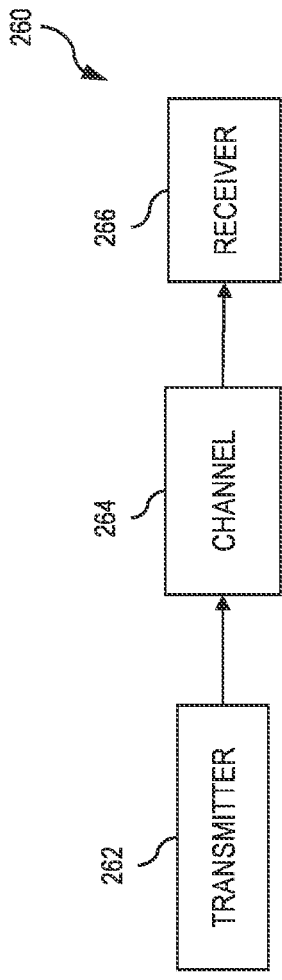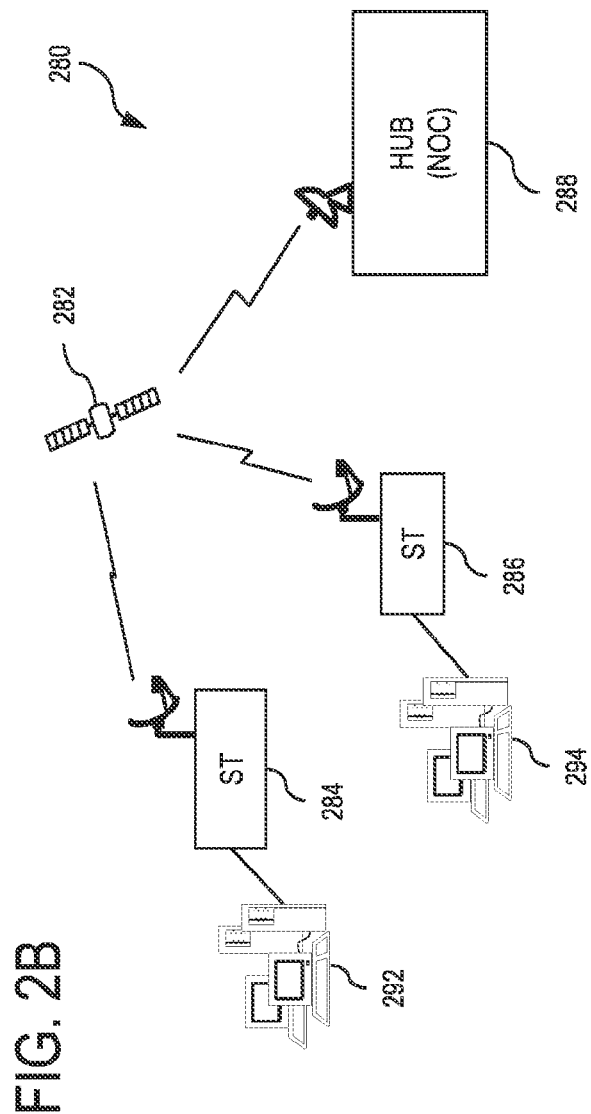

| MSF FLAG | 1 | 0 | 0 | 0 | 0 | 0 | 0 | 0 | 0 | 0 | 0 | 0 | 0 | 0 | 1 | 0 | 0 | 0 | ... | 0 | 0 | 0 |
|---|---|---|---|---|---|---|---|---|---|---|---|---|---|---|---|---|---|---|---|---|---|---|
| INDICATOR | 0 | 1 | 2 | 3 | 4 | 5 | 6 | 7 | 0 | 1 | 2 | ... | 6 | 7 | 0 | 1 | 0 | 2 | ... | 4 | 5 | 6 | 7 |
| SID | 0 | 1 | 2 | 3 | 2 | 4 | 0 | 2 | 0 | 1 | 2 | ... | 0 | 2 | 0 | 4 | 0 | 1 | ... | 1 | 2 | 3 | 4 |
| SSN | 0 | 1 | 2 | 3 | 4 | 5 | 6 | 7 | 8 | 9 | 10 | ... | 1022 | 1023 | 0 | 1 | 2 | ... | 1020 | 1021 | 1022 | 1023 |

FIG. 22

SYSTEM AND METHOD FOR MULTI-CARRIER MULTIPLEXING

RELATED APPLICATIONS

This application is a Continuation-In-Part (CIP) of U.S. patent application Ser. No. 13/086,702, filed Apr. 14, 2011 now abandoned, titled System and Method for Multi-Carrier Multiplexing, which claims priority under 35 U.S.C. §119 based on U.S. Provisional Application Ser. No. 61/324,085, filed Apr. 14, 2010, the disclosures of which are incorporated herein by reference in their entireties.

BACKGROUND

Transportation of higher throughput advanced services via a satellite transponder has been an engineering design constraint for decades. The transmission system and receiver system are the main two areas of a satellite broadcast system. High capacity data services over satellite are among the primary technology challenges facing the industry and satellite system operators today. Digital video broadcast—satellite second generation (DVB-S2) is an enhanced specification for satellite digital television broadcast developed in 2003 and ratified in March 2005. The DVB-S2 standard is as follows: Digital Video Broadcasting (DVB), Second Generation Framing Structure, Channel Coding and Modulation Systems for Broadcasting, Interactive Services, News Gathering and other Broadband Satellite Applications, DVB-S2 Standard ETSI EN 302 307 v1.2.1 (2009-08), the entirety of which is incorporated herein by reference (hereinafter referred to as the "DVB-S2 Standard"). Using the traditional mechanism over the standard DVB-S2, while supporting high bandwidth and interactive services, however, requires significantly higher performance satellite transponders to support data rates.

FIG. 1 illustrates an example conventional transmitter. As illustrated in the figure, a transmitter 100 includes a code rate organizer (CRO) 102, a modulator 104, a match filter 106 and a digital-to-analog converter (DAC) 108. CRO 102 may be arranged to receive an outroute stream signal 110 and output a signal 112. Modulator 104 may be arranged to receive signal 112 and output a modulated signal 114. Match filter 106 may be arranged to receive modulated signal 114 and output a transmit signal 116. DAC 108 may be arranged to receive transmit signal 116 and output an analog signal 118. CRO 102 may determine the modulation and coding to be performed for outroute stream signal 110 in order to generate output signal 112. CRO 102 may perform coding for information to be communicated to remote receivers (not shown) as addressed by outroute stream signal 110. Modulator 104 may encode received signal 112 and output modulated signal 114. Modulator 104 may code a digital data input payload for ensuring a receive terminal can decode and perform error correction for errors occurring in a received payload. Match filter 106 may perform filtering in order to maximize the signal-to-noise ratio of a signal in the presence of an additive noise. DAC 108 may convert digital modulated transmit signal 116 to analog signal 118. In operation, CRO 102 may receive and perform coding for received signal outroute stream signal 110. Modulator 104 may receive signal 112 and perform forward error correction and modulation. Match filter 106 may receive signal which has been coded, forward error corrected and modulated and perform filtering on the received signal in order to maximize the signal-to-noise ratio of the signal in the presence of additive noise. Finally, DAC 108 may convert the coded, forward error corrected, modulated and filtered signal into an analog continuous waveforms for transmission.

In a conventional satellite system, data streams may be coded, modulated and broadcast to a multiplicity of mobile terminals. A typical conventional transmitter can receive a signal with up to 45 million symbols per second (Msps). However, in order to meet the demand for today's high definition and advanced services, terminals may be required to support significantly more than the 45 Msps. To achieve high data rates, for example up to 220 Msps, needed by the satellite communications industry using conventional techniques would require expensive equipment with significantly high power consumption.

What is needed is a system and method to address the challenges of transmitting and receiving high quality video, advanced services, and other data services via satellite, at enhanced data rates, in a cost effective and efficient manner, for example, adhering to power consumption constraints, improving efficiency (e.g., with respect to signal synchronization and a data acquisition processes), facilitating dynamic and flexible bandwidth allocation planning, utilizing relatively low complexity and reduced cost terminal equipment, and remaining compliant with the DVB-S2 Standard.

Some Exemplary Embodiments

The present invention advantageously addresses the needs above, as well as other needs, by providing a dynamic and flexible multiplexing scheme to allow terminals of a communications system to operate on wideband signals without requiring the decoder to operate at full speed, and under multiclass terminal operation.

According to an exemplary embodiment, a method comprises decoding, by a processing device, a one codeblock of a plurality of codeblocks within a multiplexed datastream, wherein each codeblock includes a flag that indicates whether the codeblock contains a timeplan, and the timeplan signifies a multiplexing structure of the datastream; and determining whether the flag of the one codeblock indicates that the one codeblock contains the timeplan. Wherein, if it is determined that the one codeblock contains the timeplan, the method further comprises acquiring the timeplan. According to a further exemplary embodiment, the method comprises, in response to a determination that the one codeblock does not contain the timeplan, determining a first subsequent codeblock of the of the plurality of codeblocks; decoding, by the processing device, the first subsequent codeblock; and determining whether the flag of the first subsequent codeblock indicates that the first subsequent codeblock contains the timeplan. Wherein, if it is determined that the first subsequent codeblock contains the timeplan, the method further comprises acquiring the timeplan. In accordance with such methods, each codeblock may further include a sequence number indicator that indicates a sequence position of the one codeblock within a first group of the plurality of codeblocks, and the determination of the first subsequent codeblock can be based on one or more of a decode rate of the processing device and the sequence number indicator. Further, the first group may comprise a number of codeblocks based on a number of bits of the sequence number indicator, and the determination of the first subsequent codeblock comprises skipping, based on the sequence number indicator, to a first codeblock of a second group of codeblocks, wherein the second group comprises a number of codeblocks equal to the number of codeblocks of the first group. Wherein, in response to a determination that the first subsequent codeblock does not contain the timeplan, the method may further comprise determining a second subsequent codeblock of the of the plurality of codeblocks, wherein the determination of the second subsequent codeblock comprises skipping, based on the number of codeblocks of the second group, to a first codeblock of a third group of codeblocks; decoding, by the processing device, the second subsequent codeblock; and determining whether the flag of the second subsequent codeblock indicates that the second subsequent codeblock contains the timeplan. Wherein, if it is determined that the second subsequent codeblock contains the timeplan, the method further comprises acquiring the timeplan.

According to another exemplary embodiment, an apparatus comprises: a receiver module configured to receive a multiplexed datastream comprising a plurality of codeblocks; and a processor device configured to, decode a one codeblock of the plurality of codeblocks, wherein each codeblock includes a flag that indicates whether the codeblock contains a timeplan, and the timeplan signifies a multiplexing structure of the datastream, determine whether the flag of the one codeblock indicates that the one codeblock contains the timeplan, and acquire the timeplan from the one codeblock if it is determined that the one codeblock contains the timeplan. Wherein, in response to a determination that the one codeblock does not contain the timeplan, the processor device is further configured to: determine a first subsequent codeblock of the of the plurality of codeblocks; decode the first subsequent codeblock; determine whether the flag of the first subsequent codeblock indicates that the first subsequent codeblock contains the timeplan; and acquire the timeplan from the first subsequent codeblock if it is determined that the first subsequent codeblock contains the timeplan. In accordance with such an apparatus, each codeblock may include a sequence number indicator that indicates a sequence position of the one codeblock within a first group of the plurality of codeblocks, and the processor device determines the first subsequent codeblock based on one or more of a decode rate of the processor device and the sequence number indicator. Further, the first group may comprise a number of codeblocks based on a number of bits of the sequence number indicator, and the processor device determines the first subsequent codeblock by skipping, based on the sequence number indicator, to a first codeblock of a second group of codeblocks, wherein the second group comprises a number of codeblocks equal to the number of codeblocks of the first group. Wherein, in response to a determination that the first subsequent codeblock does not contain the timeplan, the processor device is further configured to: determine a second subsequent codeblock of the of the plurality of codeblocks, wherein the processor device determines the second subsequent codeblock by skipping, based on the number of codeblocks of the second group, to a first codeblock of a third group of codeblocks; decode the second subsequent codeblock; determine whether the flag of the second subsequent codeblock indicates that the second subsequent codeblock contains the timeplan; and acquire the timeplan from the second subsequent codeblock if it is determined that the second subsequent codeblock contains the timeplan.

According to another exemplary embodiment, a communications system, comprises: a first communications terminal comprising a transmitter module configured to, multiplex codeblocks of a plurality of outroute data streams into a multiplexed datastream comprising a sequence of the codeblocks multiplexed in accordance with a multiplexing structure, insert a timeplan codeblock into the multiplexed datastream, wherein the timeplan codeblock includes a timeplan that signifies the multiplexing structure, and transmit the multiplexed datastream over the communications system. The apparatus further comprises a second communications terminal, comprising: a receiver module configured to receive the multiplexed datastream; and a processor device configured to, decode a one codeblock of the multiplexed datastream, wherein each codeblock includes a flag that indicates whether the codeblock contains the timeplan, determine whether the flag of the one codeblock indicates that the one codeblock contains the timeplan, and acquire the timeplan from the one codeblock if it is determined that the one codeblock contains the timeplan. Wherein, in response to a determination that the one codeblock does not contain the timeplan, the processor device is further configured to: determine a first subsequent codeblock of the of the multiplexed datastream; decode the first subsequent codeblock; determine whether the flag of the first subsequent codeblock indicates that the first subsequent codeblock contains the timeplan; and acquire the timeplan from the first subsequent codeblock if it is determined that the first subsequent codeblock contains the timeplan. In accordance with such a system, each codeblock may further include a sequence number indicator that indicates a sequence position of the one codeblock within a first group of the codeblocks of the multiplexed datastream, and the processor device determines the first subsequent codeblock based on one or more of a decode rate of the processor device and the sequence number indicator. Further, the first group comprises a number of codeblocks based on a number of bits of the sequence number indicator, and the processor device determines the first subsequent codeblock by skipping, based on the sequence number indicator, to a first codeblock of a second group of codeblocks, wherein the second group comprises a number of codeblocks equal to the number of codeblocks of the first group. Wherein, in response to a determination that the first subsequent codeblock does not contain the timeplan, the processor device is further configured to: determine a second subsequent codeblock of the of the plurality of codeblocks, wherein the processor device determines the second subsequent codeblock by skipping, based on the number of codeblocks of the second group, to a first codeblock of a third group of codeblocks; decode the second subsequent codeblock; determine whether the flag of the second subsequent codeblock indicates that the second subsequent codeblock contains the timeplan; and acquire the timeplan from the second subsequent codeblock if it is determined that the second subsequent codeblock contains the timeplan.

According to further exemplary embodiments, each codeblock may further include a class indicator indicating a communication device class that is designated to decode the codeblock, and/or a sequence number specifying a sequence position of the codeblock within a superframe of the multiplexed datastream. Further, each codeblock may be associated with a sequence number signifying a sequence position of the codeblock within a superframe of the multiplexed datastream, and the flag further indicates whether the sequence number of the one codeblock signifies that the one codeblock is of a first position within the superframe, and wherein the method further comprises resetting a counter for tracking the sequence number of each of the codeblocks in response to a determination that the one codeblock contains the timeplan. Further, the codeblocks may be organized within one or more superframes within the datastream, where each codeblock is of a sequence number indicating a position of the codeblock within a respective superframe, and the timeplan signifies the sequence number of each codeblock and a respective class indicator indicating a communication device class that is designated to decode the respective codeblock.

According to further exemplary embodiments, the outroute data streams of the communications system may comprise one or more of at least one point-to-point traffic stream, at least one multicast traffic stream and at least one broadcast traffic stream, and wherein the second communications terminal is configured to decode and process one or more of the traffic streams. Further, sizes of the traffic streams may be dynamically varied based on offered loads, priorities and other policies, up to a modulated carrier symbol rate, wherein the timeplan signifies configurations of the traffic stream sizes. Moreover, the timeplan signifies one or more of at least one broadcast traffic stream and at least one or multicast traffic stream based on one or more of communities of interest, subscriptions and data plan allocations associated with the second communications terminal, whereby the second communications terminal processes only the traffic streams for which the terminal is designated.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which:

FIGS. 2A and 2B illustrate communications systems capable of employing a dynamic and flexible multiplexing scheme in accordance with various exemplary embodiments;

FIG. 22 illustrates an example of the signaling, for a multiplexing scheme employed with a packetized MPE or packetized GSE protocol, where the SID is explicitly coded, the SSN is implicitly coded and an SSN indicator is coded within the header of a codeblock, in accordance with an exemplary embodiment;

DETAILED DESCRIPTION

Figure 1:
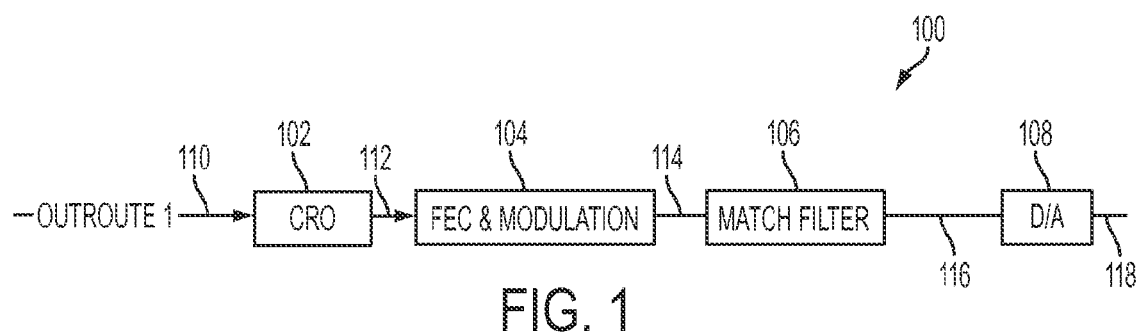
FIG. 1 illustrates a block diagram of an example conventional transmitter.

In accordance with an aspect of the present invention, a dynamic and flexible multiplexing scheme to allow terminals of a communications system to operate on wideband signals without requiring the decoder to operate at full speed, and under multiclass terminal operation, is provided. A plurality of outroute data streams may be multiplexed at the transmitter side, thereby achieving multiple times greater data capacity than existing transmitters. Similarly, a received multiplexed data stream may be demultiplexed at the receiver side in order to achieve greater data capacity.

FIGS. 2A and 2B illustrate communications systems capable of employing a dynamic and flexible multiplexing scheme according to various exemplary embodiments of the present invention. With reference to FIG. 2A, a digital communications system 260 includes one or more transmitters 262 (of which one is shown) that generate signal waveforms across a communication channel 264 to one or more receivers 266 (of which one is shown). In this discrete communications system 260, the transmitter 262 has a signal source that produces a discrete set of data signals, where each of the data signals has a corresponding signal waveform. These signal waveforms are attenuated, or otherwise altered, by communications channel 264. To combat noise and other issues associated with the channel 264, coding may be utilized. For example, forward error correction (FEC) codes can be employed.

FIG. 2B illustrates an exemplary satellite communications system 280 capable of supporting communication among terminals with varied capabilities, according to an embodiment of the present invention. Satellite communications system 280 includes a satellite 262 that supports communication among multiple satellite terminals (STs) 284, 286 and a hub 288. The HUB 288 may assume the role of a Network Operations Center (NOC), which controls the access of the STs 284, 286 to the system 280 and also provides element management functions and control of the address resolution and resource management functionality. The Satellite communications system 280 may operate as a traditional bent-pipe system, where the satellite essentially operates as a repeater. Alternatively, the system 280 may employ a switching or processing satellite supporting mesh communications (point-to-point communications directly between, for example, the two STs 284, 286).

In a traditional bent-pipe system of an exemplary embodiment, the satellite 262 operates as a repeater or bent pipe, and communications between the STs 284, 286 are transmitted over a double-hop path. For example, in a communication from ST 284 to ST 286, over the first hop, the communication is transmitted, via the satellite, from the ST 284 to the HUB 288. The HUB 288 decodes the communication and determines the destination ST 286. The HUB 288 then appropriately addresses and repackages the communication, encodes and modulates it, and transmits the communication over the second hop, via the satellite, to the destination ST 286. Accordingly, the satellite of such a system acts as a bent pipe or repeater, transmitting communications between the HUB 288 and the STs 284, 286.

In an alternate embodiment, with a communications system 280 that employs a processing satellite (e.g., including a packet switch operating, for example, at a data link layer), the system may support direct unicast (point-to-point) communications and multicast communications among the STs 284, 286. In the case of a processing satellite, the satellite 262 decodes the received signal and determines the destination ST or STs (as the hub 288 would in a bent-pipe system). The satellite 262 then addresses the data accordingly, encodes and modulates it, and transmits the modulated signal, over the channel 113, to the destination ST or STs (e.g., ST 286) The STs 284, 286 provide connectivity to one or more hosts 292, 294, respectively. According to one embodiment of the present invention, the system 280 has a fully meshed architecture, whereby the STs 284, 286 may directly communicate.

In an example embodiment, a transmitter has a four outroute streams, multiplexed into one 220 Msps outroute stream. The outroute streams may be multiplexed with either a Time Division Multiplexing (TDM) scheme or a Code Division Multiplexing (CDM) scheme, that can be sent over the satellite system. Before being multiplexed, each outroute stream may be coded with a relatively low rates, for example 55 Msps.

Figure 2C:
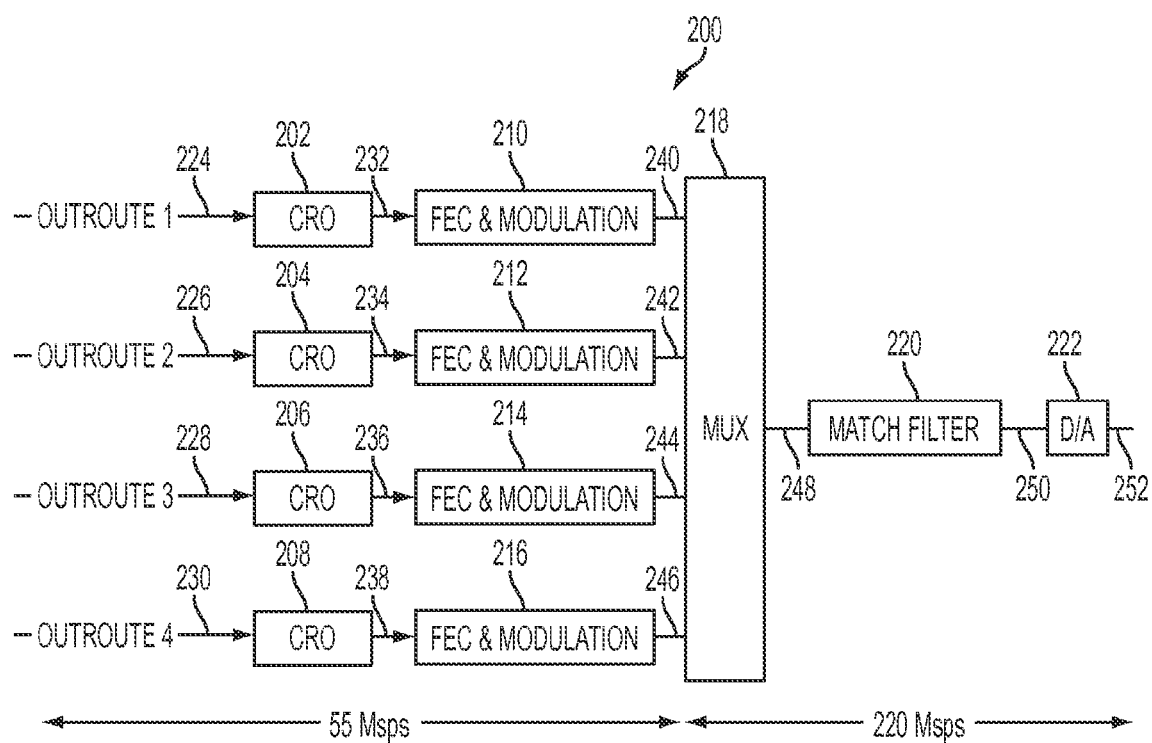
FIG. 2C illustrates a block diagram of a transmitter implementing a TDM multiplexing scheme. in accordance with an exemplary embodiment.

FIG. 2C illustrates an example transmitter, in accordance with an aspect of the present invention. A transmitter 200 includes a CRO 202, a CRO 204, a CRO 206, a CRO 208, a modulator 210, a modulator 212, a modulator 214, a modulator 216, a multiplexer 218, a match filter 220 and a DAC 222. CRO 202 may be arranged to receive an outroute stream signal 224 and output a signal 232. Modulator 210 may be arranged to output a modulated signal 240 based on signal 232. In some embodiments, modulator 210 is arranged to receive signal 232 directly from CRO 202. Similarly, CRO 204 may be arranged to receive an outroute stream signal 226 and output a signal 234. Modulator 212 may be arranged to output a modulated signal 242 based on signal 234. In some embodiments, modulator 212 is arranged to receive signal 234 directly from CRO 204. CRO 206 may be arranged to receive an outroute stream signal 228 and output a signal 236. Modulator 214 may be arranged to output a modulated signal 244 based on signal 236. In some embodiments, modulator 214 is arranged to receive signal 236 directly from CRO 206. CRO 208 may be arranged to receive an outroute stream signal 230 and output a signal 238. Modulator 216 may be arranged to output a modulated signal 246 based on signal 238. In some embodiments, modulator 216 is arranged to receive signal 238 directly from CRO 208. Multiplexer 218 may be arranged to output a multiplexed signal 248 based on modulated signals 240, 242, 244 and 246. In some embodiments, multiplexer 218 is arranged to receive modulated signals 240, 242, 244 and 246 directly from modulator 210, modulator 212, modulator 214 and modulator 216, respectively. Match filter 220 may be arranged to output a filtered signal 250 based on multiplexed signal 248. Non-limiting examples of modulation types supported by filtered signal 250 include TDM and CDM. In some embodiments, match filter 220 is arranged to receive multiplexed signal 248 directly from multiplexer 218. A match filter, on the transmitter side, is used to limit the bandwidth and reduce adjacent channel interference. On a corresponding receiver side (not shown), a match filter is used as an optimal linear filter for maximizing the signal to noise ratio in the presence of noise. DAC 222 may be arranged to output an analog signal 252 based on filtered signal 250. In some embodiments, DAC 222 is arranged to receive filtered signal 250 directly from match filter 220.

CRO 202, CRO 204, CRO 206 and CRO 208 may perform modulation and coding of outroute stream signals 224, 226, 228 and 230, respectively, and output coded signals 232, 234, 236 and 238, respectively, in a manner similar to CRO 102 of FIG. 1. Modulators 210, 212, 214 and 216, receive and encode and bit-to-symbol map coded signals 232, 234, 236 and 238, respectively, and output modulated signals 240, 242, 244 and 246, respectively, in a manner similar to modulator 104 of FIG. 1. Multiplexer 218 multiplexes modulated signals 240, 242, 244 and 246 into one outroute stream as denoted by multiplexed signal 248. By multiplexing modulated signals 240, 242, 244 and 246 into one outroute stream, transmitter 200 is able to utilize a single device or resource, in this case DAC 222, to transmit a plurality of signals. Match filter 220 may filter multiplexed signal 248 in order to maximize the signal-to-noise ratio of the transmitted signal, in a similar manner as discussed above with reference to match filter 106 of FIG. 1. DAC 222 may convert transmit filtered signal 250 to analog signal 252. Each pair of CRO 202 and modulator 210, CRO 204 and modulator 212, CRO 206 and modulator 214, and CRO 208 and modulator 216 may operate in a similar manner as the pair of CRO 102 and modulator 104 as discussed above with reference to FIG. 1. For purposes of discussion, presume that each pair of CRO 202 and modulator 210, CRO 204 and modulator 212, CRO 206 and modulator 214, and CRO 208 and modulator 216 may operate at a rate of 55 Msps, similar to the conventional transmitter discussed above with reference to FIG. 1.

In contrast with the conventional system discussed above with reference to FIG. 1, in accordance with an aspect of the present invention, multiplexer 218 may operate at a much higher rate. For purposes of explanation, presume that in this example embodiment, multiplexer 218, match filter 220 and DAC 222 may operate at a rate of 220 Msps. The 220 Msps performance of multiplexed signal 248 represents the aggregation of four 55 Msps as denoted by modulated signal 240, 242, 244 and 246. Multiplexed signal 248 may then be processed via match filter 220 to generate transmit filtered signal 250. Match filter 220 may operate in a similar manner as match filter 106 as discussed with reference to FIG. 1, however at a significantly increased rate of operation. DAC 222 may convert transmit filtered signal 250 into analog which may then transmitted as analog signal 252. DAC 222 may operate in a similar manner as DAC 108 as discussed above with reference to FIG. 1, however at a significantly higher rate of operation.

In accordance with a multiplexed arrangement of the present invention, a plurality of outroute streams may be modulated, each at a conventional rate. Then the plurality of modulated outroute streams may be multiplexed together, filtered and converted into analog signals at a much higher rate. Accordingly, the overall data throughput provided by a transmitter in accordance with the present invention is much greater than that of a conventional transmitter as a result of aggregating multiple conventional information streams into an aggregate information stream performing at a significantly higher rate of operation.

Figure 3:
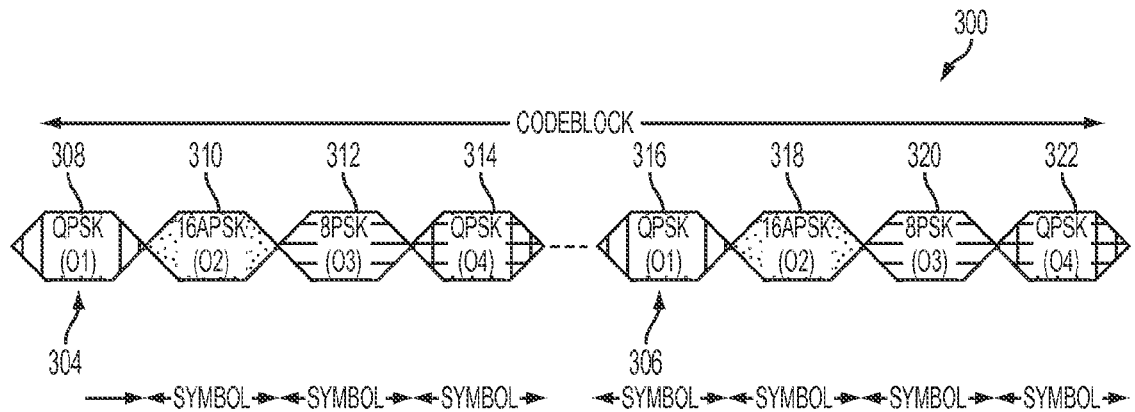
FIG. 3 illustrates an example TDM stream output from the multiplexer of FIG. 2C, multiplexed on a symbol basis, in accordance with an exemplary embodiment.

FIG. 3 illustrates an example TDM stream 300 output from the multiplexer 218, in accordance with an aspect of the present invention, where the outroute streams 224, 226, 228 and 230 are multiplexed on a symbol level. As illustrated in the figure, the codeblock stream 300 includes a sub-stream 304, a plurality of additional portions illustrated with a series of dots, and a sub-stream 306. Sub-stream 304 includes a symbol 308, a symbol 310, a symbol 312 and a symbol 314. Sub-stream 306 includes a symbol 316, a symbol 318, a symbol 320 and a symbol 322. In this example, presume that symbol 308 corresponds to a first symbol, and symbol 316 corresponds to a last symbol, of a codeblock of outroute sub-stream signal 224 of FIG. 2C, and have been modulated with a QPSK modulation scheme. In this example, presume that symbol 310 corresponds to a first symbol, and symbol 318 corresponds to a last symbol, of a codeblock of outroute sub-stream signal 226, and have been modulated with a 16APSK modulation scheme. In this example, presume that symbol 312 corresponds to a first symbol, and symbol 320 corresponds to a last symbol, of a codeblock of outroute sub-stream signal 228, and have been modulated with an 8PSK modulation scheme. In this example, presume that symbol 314 corresponds to a first symbol, and symbol 322 corresponds to a last symbol, of a codeblock of outroute sub-stream signal 230, and have been modulated with a QPSK modulation scheme.

In operation, multiplexer 218 first receives a symbol of modulated signal 240 as symbol 308, a symbol of modulated signal 242 as symbol 310, a symbol of modulated signal 244 as symbol 312, and a symbol of modulated signal 246 as symbol 314. Where symbols 308, 310, 312 and 314 represent the first symbols of a codeblock of modulated signals 240, 242, 244 and 246, respectively. Multiplexer 218 continues to receive modulated signals 240, 242, 244 and 246 until codeblock 300 is completely transmitted, ending with the receipt of symbols 316, 318, 320 and 322, corresponding to the last symbols of the codeblock of modulated signals 240, 242, 244 and 246, respectively. In other words, as illustrated in FIG. 3, codeblock 300 reflects a multiplexed stream, on a symbol level, of respective codeblocks of the outroute signals 224, 226, 228 and 230.

Figure 4:
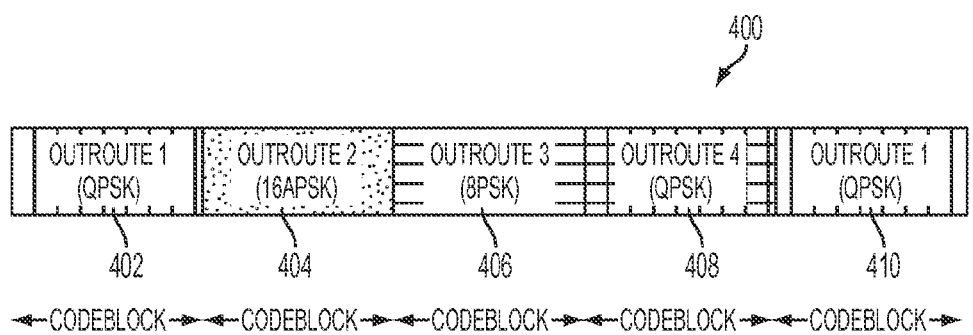
FIG. 4 illustrates an example TDM stream output from the multiplexer of FIG. 2C, multiplexed on a codeblock basis, in accordance with an exemplary embodiment.

FIG. 4 illustrates an example TDM stream 400 output from the multiplexer 218, in accordance with an aspect of the present invention, where the outroute streams 224, 226, 228 and 230 are multiplexed on a codeblock level. As illustrated in FIG. 4, TDM codeblock data stream 400 includes an outroute codeblock 402, an outroute codeblock 404, an outroute codeblock 406, an outroute codeblock 408 and an outroute codeblock 410, where each of the outroute codeblocks 402, 404, 406, 408 and 410 reflects a whole codeblock of the outroutes 224, 226, 228, 230 and 224, respectively (e.g., an entire DVB-S2 codeblock or frame, including the respective headers). Outroute codeblocks 402 and 410 are denoted as having been modulated via QPSK. Outroute codeblock 404 is denoted as having been modulated via 16APSK. Outroute codeblock 406 is denoted as having been modulated via 8APSK. Outroute codeblock 408 is denoted as having been modulated via QPSK. It should be noted that an output stream may have a plurality of codeblocks that have been modulated with different types of modulation schemes. For example, although in this example, outroute codeblocks 402 and 410 are each in outroute stream 1 and are denoted as having been modulated via QPSK, in other examples, outroute stream 1 may have outroute codeblocks that have been modulated via other modulation schemes. Accordingly, as illustrated in FIG. 4, TDM stream 400 reflects a multiplexed stream, on a codeblock level, of respective codeblocks of the outroute signals 224, 226, 228 and 230, and then beginning again with a next codeblock of outroute stream 224.

In order to reduce complexity, cost and power consumption, a receiver may perform selective reception. For purposes of discussion, presume that four receivers are arranged to receive a signal transmitted from transmitter 200. For example, a first receiver may receive and reassemble the QPSK codeblock of outroute stream signal 224 of FIG. 2C, which correspond to a sampling denoted by example outroute codeblocks 402 and 410 of FIG. 4. The first receiver may ignore the other codeblocks that do not correspond to outroute stream signal 224, for example a sampling denoted by example outroute codeblocks 404, 406 and 408. Similarly, a second receiver may receive and reassemble the 16APSK codeblock of outroute stream signal 226 of FIG. 2C, which correspond to a sampling denoted by example outroute codeblock 404 of FIG. 4. The second receiver may ignore the other codeblocks that do not correspond to outroute stream signal 226, for example a sampling denoted by example outroute codeblocks 402, 406, 408 and 410. Further, a third receiver may receive and reassemble the 8PSK codeblock of outroute stream signal 228 of FIG. 2C, which correspond to a sampling denoted by example outroute codeblock 406 of FIG. 4. The third receiver may ignore the other codeblocks that do not correspond to outroute stream signal 228, for example a sampling denoted by example outroute codeblocks 402, 404, 408 and 410. Finally, a fourth receiver may receive and reassemble the QPSK codeblock of outroute stream signal 230 of FIG. 2C, which correspond to a sampling denoted by example outroute codeblock 408 of FIG. 4. The fourth receiver may ignore the other codeblocks that do not correspond to outroute stream signal 230, for example a sampling denoted by example outroute codeblocks 402, 404, 406 and 410.

Again, in accordance with an aspect of the present invention, a single transmitter is operable to transmit a single data stream that includes a plurality of outroute codeblocks that have been multiplexed together. A single receiver will be able to receive the entire single data stream. For efficient processing, the receiver will only process a portion of the entire received single data stream. This aspect of the present invention will now be described with reference to FIG. 5.

Figure 5:
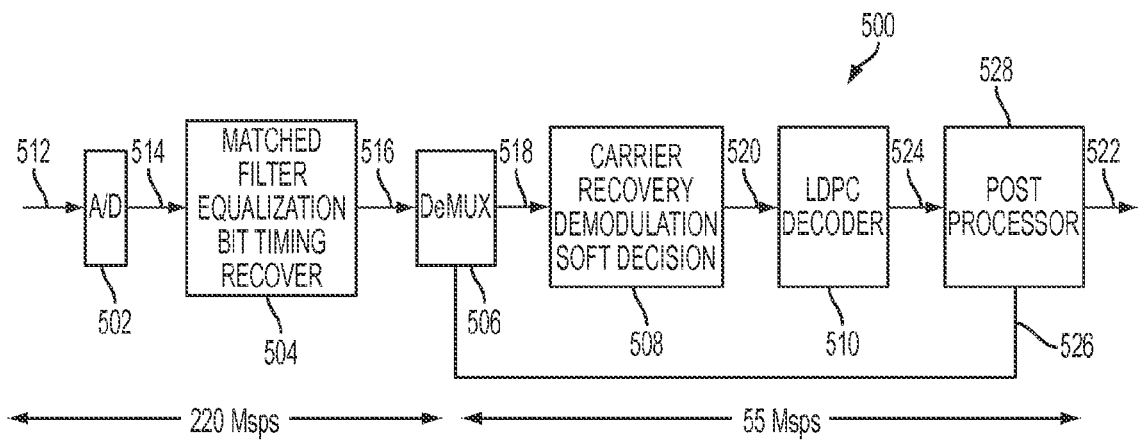
FIG. 5 illustrates a block diagram of a receiver that demultiplexes a data stream at an enhanced data rate, and partially demodulates and decodes the data stream at a lower data rate, in accordance with an exemplary embodiment.

FIG. 5 illustrates an example receiver, in accordance with an aspect of the present invention. A receiver 500 includes an analog-to-digital converter (ADC) 502, a match filter equalizer 504, a de-multiplexer 506, a demodulator 508, a low density parity check (LDPC) decoder 510 and a post processor 528. ADC 502 may be arranged to receive an analog signal 512 from transmitter 200 and to output a digital signal 514. Match filter equalizer 504 may be arranged to output a digital signal 516 based on digital signal 514. In some embodiments, match filter equalizer 504 is arranged to receive digital signal 514 directly from ADC 502. De-multiplexer 506 may be arranged to output a de-multiplexed signal stream 518 based on digital signal 516 and a data signal 526. In some embodiments, de-multiplexer 506 is arranged to receive digital signal 516 directly from match filter equalizer 504. In some embodiments, de-multiplexer 506 is arranged to receive data signal 526 directly from post processor 528. Demodulator 508 may be arranged to output a demodulated signal 520 based on de-multiplexed signal stream 518. In some embodiments, demodulator 508 is arranged to receive de-multiplexed signal stream 518 directly from de-multiplexer 506. LDPC decoder 510 may be arranged to output a decoded signal 524 based on demodulated signal 520. In some embodiments, LDPC decoder 510 is arranged to receive demodulated signal 520 directly from demodulator 508. Post processor 528 may be arranged to output a data signal 522 and data signal 526, each based on decoded signal 524. In an example embodiment, post processor 528 is arranged to receive decoded signal 524 directly from LDPC decoder 510.

ADC 502 converts received analog signals transmitted from an analog format to a digital format. Match filter equalizer 504 performs matched filtering of digital signal 514 in order to maximize the signal-to-noise ratio of the received signal. Furthermore, match filter equalizer 504 may perform recovery of bit timing. De-multiplexer 506 may select the portions of the received signal for processing. Demodulator 508 performs demodulation of the symbols selected by de-multiplexer 506 to form a reassembled codeblock. LDPC decoder 510 may decode of the received signal. Post processor 528 may provide timeplan information to de-multiplexer 506 such that de-multiplexer 506 may select the correct codeblocks for delivery to demodulator 508. The timeplan information will be described in greater detail below.

In operation, receiver 500 receives analog signal 512. After ADC 502 converts analog signal 512 to digital signal 514, match filter equalizer 504 filters digital signal 514 to maximize the signal-to-noise ratio and thus improve signal quality. Match filter equalizer 504 may also operate to perform bit timing recovery in order to determine the starting and ending times for received symbols. De-multiplexer 506 then selects the portions of digital signal 516 for processing. For example, as described with reference to FIG. 3 and FIG. 4, de-multiplexer 506 may select to pass symbol 308 and symbol 316 via digital signal 516 and reject other symbols. Demodulator 508 performs demodulation of the symbols selected by de-multiplexer 506 to form a reassembled codeblock. For example, as described with reference to FIG. 3 and FIG. 4, a multiplicity of symbols with a sampling denoted as symbol 308 and symbol 316 may be reassembled to form the codeblock denoted as outroute codeblock 402. De-multiplexed signal stream may then be processed into original streams delivered to LDPC decoder 510 for decoding. LDPC codes may be defined as Low Density Parity Codes and having an easily parallelizable decoding algorithm, performing simple arithmetic operations suitable for iterative decoding. Post processor 528 may receive the digitized, filtered, de-multiplexed, demodulated, reassembled and decoded signal for error detection and timeplan management.

As will be described in more detail below, analog signal 512 will include a timeplan indicating which codeblocks receiver 500 should decode. Post processor 528 will use this information to instruct de-multiplexer 506 as to which portions of digital signal 516 to pass for processing. In order to reduce complexity, cost and power consumption, receiver 500 may perform selective reception. For purposes of discussion, presume that receiver 500 is intended to receive and reassemble the 16APSK symbols of outroute stream signal 226 of FIG. 2C, which correspond to a sampling denoted by example outroute codeblock 404 of FIG. 4. Receiver 500 may ignore the other symbols that do not correspond to outroute stream signal 226, for example a sampling denoted by example outroute codeblocks 402, 406, 408 and 410.

In accordance with a multiplexed arrangement of the present invention, a single received stream that includes a plurality of outroute streams may be demultiplexed at a very high rate. Then the single batch of codeblocks selected by the multiplexer may be demodulated, decoded and processed at a much lower rate. Accordingly, the overall data processed by a receiver in accordance with the present invention may be similar to that of a conventional transmitter even though the received signal is received at a significantly higher rate. In other words, in accordance with an aspect of the present invention, a single transmitter is operable to transmit a single data stream that includes a plurality of outroute codeblocks that have been multiplexed together. Receiver 500 will be able to receive the entire single data stream. For efficient processing, receiver 500 will only process a portion of the entire received single data stream.

In the example embodiment discussed above with reference to FIG. 5, a received signal is de-multiplexed and is then demodulated. However, in other embodiments, a received signal may first be demodulated and then de-multiplexed. This will now be described in greater detail below with reference to FIG. 6.

Figure 6:
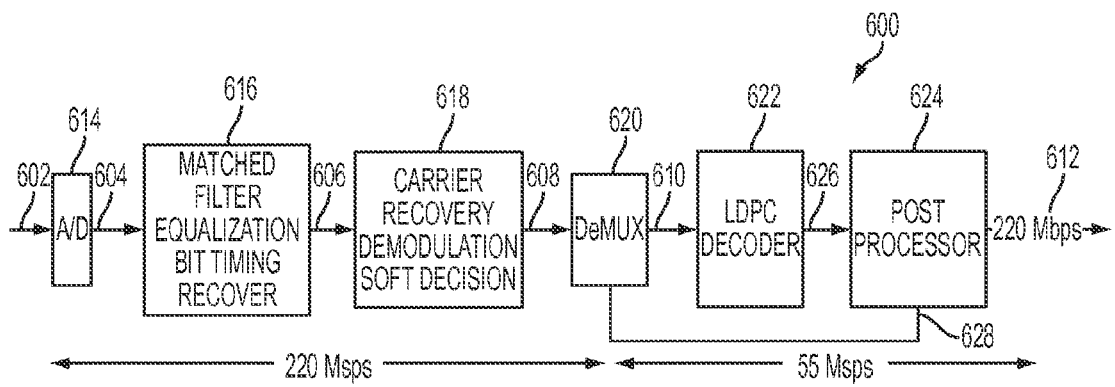
FIG. 6 illustrates a block diagram of a receiver that demodulates and demultiplexes a data stream at an enhanced data rate, and decodes the data stream at a lower data rate, in accordance with an exemplary embodiment.

FIG. 6 illustrates an example receiver with carrier recovery performed prior to the de-multiplexer in accordance with an aspect of the present invention. As illustrated in the figures, a receiver 600 includes an ADC 614, a match filter equalizer 616, a demodulator 618, a de-multiplexer 620, a LDPC decoder 622 and a post processor 624. ADC 614 may be arranged to receive an analog signal 602 from satellite transmitter 200 and to output a digital signal 604. Match filter equalizer 616 is arranged output a recovered signal 606 based on digital signal 604. In some embodiments, match filter equalizer 616 is arranged to receive digital signal 604 directly from ADC 614. Demodulator 618 is arranged to output a demodulated signal 608 based on recovered signal 606. In some embodiments, demodulator 618 is arranged to receive recovered signal 606 directly from match filter equalizer 616. De-multiplexer 620 may be arranged to output a de-multiplexed signal stream 610 based on demodulated signal 608 and a feedback signal 628. In some embodiments, de-multiplexer 620 is arranged to receive demodulated signal 608 directly from demodulator 618. In some embodiment, de-multiplexer 620 is arranged to receive feedback signal 628 directly from post processor 624. LDPC decoder 622 may be arranged to output a decoded data signal 626 based on de-multiplexed signal stream 610. In some embodiments, LDPC decoder 622 is arranged to receive de-multiplexed signal stream 610 directly from de-multiplexer 620. Post processor 624 may be arranged to output a data signal 612 based on decoded data signal 626 and also to deliver timeplan information via feedback signal 628 based on decoded data signal 626. In some embodiments, post processor 624 is arranged to receive decoded data signal 626 directly from LDPC decoder 622.

ADC 614 may convert received analog signals transmitted from a satellite to digital format for further processing in a similar manner to ADC 502 as discussed above with reference to FIG. 5. Match filter equalizer 616 may filter digital signal 604 in order to maximize the signal-to-noise ratio of the received signal. Furthermore, match filter equalizer 616 may perform bit timing recovery. Match filter equalizer 616 may operate in a similar manner as match filter equalizer 504 as discussed above with reference to FIG. 5. Demodulator 618 may perform demodulation of recovered signal 606 and may operate in a similar manner as demodulator 508 as discussed above with reference to FIG. 5, except demodulator 618 may operate as a significantly higher rate than demodulator 508. De-multiplexer 620 may recover the carrier signal and reassemble the digitized, filtered and demodulated received signal into the recovered de-multiplexed signal stream 610. Furthermore, de-multiplexer 620 may operate in a similar manner to de-multiplexer 506 as discussed above with reference to FIG. 5. LDPC decoder 622 performs decoding for recovery of the originally transmitted information, with exception for performing error detection/correction. LDPC decoder 622 may operate in a similar manner to LDPC decoder 510 as discussed above with reference to FIG. 5. Post processor 624 may perform error detection and for generating timeplan information for delivery to de-multiplexer 620. Post processor 624 may operate in a similar manner to post processor 528 as discussed above with reference to FIG. 5.

A difference between the embodiment discussed above with reference to FIG. 5 and the embodiment discussed above with reference to FIG. 6 is the placement of the de- multiplexer with respect to the demodulator. In the embodiment discussed above with reference FIG. 5, de-multiplexer 506 is arranged prior to demodulator 508. On the other hand, in the embodiment discussed above with reference to FIG. 6, de-multiplexer 620 is arranged after demodulator 618. Compared to receiver 500, receiver 600 in operation may require greater complexity, power consumption and processor utilization, and as a result, a higher cost.

As described with reference to FIGS. 3-6, a plurality of streams of information may be assembled and transmitted at a high rate from a single transmitter to a plurality of receivers. The information destined for a single receiver may be a portion of the information as transmitted by the transmitter. The assembly of the transmitted information and the configuration of the receiver enable a portion of the receiver to operate at a reduced rate, with an overall lower power consumption and cost. The examples as discussed above with reference to FIGS. 3-6 were performed based upon time division multiplexing. However, in accordance with another aspect of the present invention, other types of multiplexing may be used. For example, a transmitter and receiver may be configured where the multiplexing scheme may be based upon code division multiplexing (CDM). CDM employs a special coding scheme, wherein each receiver is assigned a code, to allow multiple users to be multiplexed over the same physical channel. An embodiment using CDM will now be discussed with reference to FIG. 7.

Figure 7:
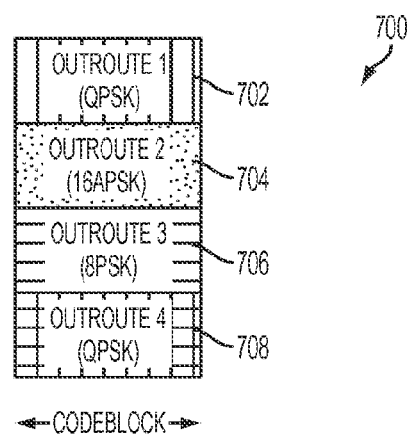
FIG. 7 illustrates an example code division multiplexed codeblock, in accordance with an exemplary embodiment.

FIG. 7 illustrates an example CDM codeblock 700. As illustrated, CDM codeblock 700 includes an outroute 702, an outroute 704, an outroute 706 and an outroute 708. Outroute 702 may be a QPSK modulated bit stream packet and configured as a portion of CDM codeblock 700. Outroute 704 may be a 16APSK modulated bit stream packet and configured as a portion of CDM codeblock 700. Outroute 706 may be an 8PSK modulated bit stream packet and configured as a portion of CDM codeblock 700. Outroute 708 may be a QPSK modulated bit stream packet and configured as a portion of CDM codeblock 700. Outroutes 702, 704, 706 and 708 may be transmitted simultaneously via a single channel. A bit of information to be transmitted may be translated into a code represented by a multiplicity of bits. The outroutes may have differing and orthogonal codes. The translated orthogonal codes for the various outroutes allows for discrimination between the codes by a receiver or receivers. In operation, individual outroute data streams may be modulated utilizing CDM scheme. Modulated CDM codeblock 700, an aggregate of outroutes 702, 704, 706 and 708, may be processed from outroute stream signals 224, 226, 228 and 230.

Figure 8:
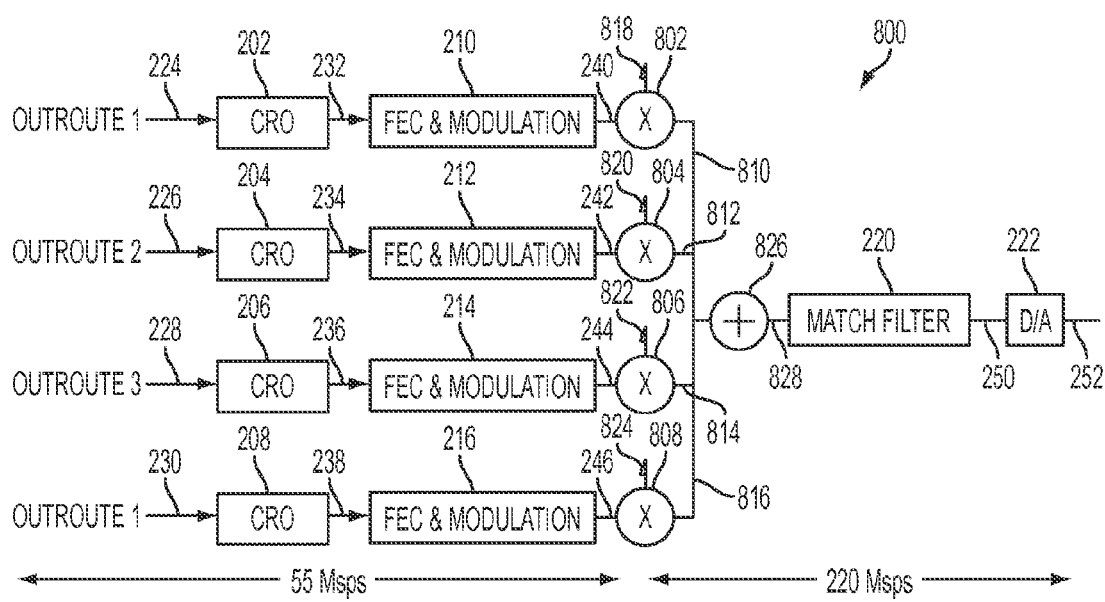
FIG. 8 illustrates a block diagram of a transmitter implementing a CDM multiplexing scheme, in accordance with an exemplary embodiment.

FIG. 8 illustrates an example transmitter performing transmission of codeblocks via CDM modulation as described with reference to the FIG. 7, in accordance with an aspect of the present invention. A transmitter 800 includes CRO 202, CRO 204, CRO 206, CRO 208, modulator 210, modulator 212, modulator 214, modulator 216, match filter 220, DAC 222, a multiplier 802, a multiplier 804, a multiplier 806, a multiplier 808 and an adder 826.

CRO 202 may be arranged to receive outroute stream signal 224 and output signal 232. Modulator 210 may be arranged to output modulated signal 240 based on signal 232. In some embodiments, modulator 210 is arranged to receive signal 232 directly from CRO 202. Similarly, CRO 204 may be arranged to receive outroute stream signal 226 and output signal 234. Modulator 212 may be arranged to output modulated signal 242 based on signal 234. In some embodiments, modulator 212 is arranged to receive signal 234 directly from CRO 204. CRO 206 may be arranged to receive outroute stream signal 228 and output signal 236. Modulator 214 may be arranged to output modulated signal 244 based on signal 236. In some embodiments, modulator 214 is arranged to receive signal 236 directly from CRO 206. CRO 208 may be arranged to receive outroute stream signal 230 and output signal 238. Modulator 216 may be arranged to output modulated signal 246 based on signal 238. In some embodiments, modulator 216 is arranged to receive signal 238 directly from CRO 208.

Multiplier 802 is arranged to output a code multiplied signal 810 based on a code 818 and modulated signal 240. In some embodiments, multiplier 802 is arranged to receive modulated signal 240 directly from modulator 210. Multiplier 804 is arranged to output a code multiplied signal 812 based on a code 820 and modulated signal 242. In some embodiments, multiplier 804 is arranged to receive modulated signal 242 directly from modulator 212. Multiplier 806 is arranged to output a code multiplied signal 814 based on a code 822 and modulated signal 244. In some embodiments, multiplier 806 is arranged to receive modulated signal 244 directly from modulator 214. Multiplier 808 is arranged to output a code multiplied signal 816 based on a code 824 and modulated signal 246. In some embodiments, multiplier 808 is arranged to receive modulated signal 246 directly from modulator 216.

Adder 826 may be arranged to output a CDM signal 828 based on code multiplied signals 810, 812, 814 and 816. In some embodiments, adder 826 is arranged to receive code multiplied signal 810 directly from multiplier 802. In some embodiments, adder 826 is arranged to receive code multiplied signal 812 directly from multiplier 804. In some embodiments, adder 826 is arranged to receive code multiplied signal 814 directly from multiplier 806. In some embodiments, adder 826 is arranged to receive code multiplied signal 816 directly from multiplier 808. Match filter 220 may be arranged output filtered signal 250 based on CDM signal 828. In some embodiments, match filter 220 is arranged to receive CDM signal 828 directly from adder 826. DAC 222 may be arranged to output analog signal 252 based on filtered signal 250. In some embodiments, DAC 222 is arranged to receive filtered signal 250 directly from match filter 220.

CRO 202, 204, 206 and 208 may operate in a similar manner as discussed above with reference to FIG. 2C. Modulators 210, 212, 214 and 216, perform modulation and forward error correction coding for input coded signals 232, 234, 236 and 238, respectively and output corresponding corrected modulated signals 240, 242, 244 and 246 in a similar manner as discussed above with reference to FIG. 2C. Multipliers 802, 804, 806 and 808 may be configured as code multipliers, performing multiplication of input signals with specific codes and delivering corresponding code multiplied signals 810, 812, 814 and 816. For example, multiplier 802 will multiply modulated signal 240 with code 818 to generate code multiplied signal 810. Adder 826 may perform a summation of input code multiplied signals 810, 812, 814 and 816 and output a single stream of CDM signal 828. Match filter 220 may perform filtering in order to maximize the signal-to-noise ratio of input CDM signal 828 and output filtered signal 250. Match filter 220 may operate in a similar manner as discussed above with reference to FIG. 2C. DAC 222 may convert filtered signal 250 to analog signal 252 in a similar manner as discussed above with reference to FIG. 2C. In this non-limiting example, four CROs may accept four outroute streams as discussed with reference to FIG. 2C. However, it should be noted that any number of CROs may be used to a corresponding number of outroute streams.

Accordingly, a receiver (not shown) that is intended to receive modulated signal 240 will recognize the code 818 aspect of code multiplied signal 810. The receiver that is intended to receive modulated signal 240 will then be able to demodulate and process the information within code multiplied signal 810, while ignoring code multiplied signals 812, 814 and 816. Similarly, another receiver that is intended to receive modulated signal 242 will be able to demodulate and process the information within code multiplied signal 812, while ignoring code multiplied signals 810, 814 and 816. Further, yet another receiver that is intended to receive modulated signal 244 will be able to demodulate and process the information within code multiplied signal 814, while ignoring code multiplied signals 810, 812, and 816. Finally, still another receiver that is intended to receive modulated signal 246 will be able to demodulate and process the information within code multiplied signal 816, while ignoring code multiplied signals 810, 812 and 814.

In accordance with a multiplexed arrangement of the present invention, a plurality of outroute streams may be modulated, each at a conventional rate. Then the plurality of modulated outroute streams may be added together, filtered and converted into analog signals at a much higher rate. Accordingly, the overall data throughput provided by a CDM transmitter in accordance with the present invention is much greater than that of a conventional CDM transmitter as a result of aggregating multiple conventional information streams into an aggregate information stream performing at a significantly higher rate of operation.

Again, in accordance with an aspect of the present invention, a single transmitter is operable to transmit a single data stream that includes a plurality of outroute codeblocks that have been multiplexed and added together. A single receiver will be able to receive the entire single data stream. For efficient processing, the receiver will only process a portion of the entire received single data stream. This aspect of the present invention will now be described with reference to FIG. 9.

Figure 9:
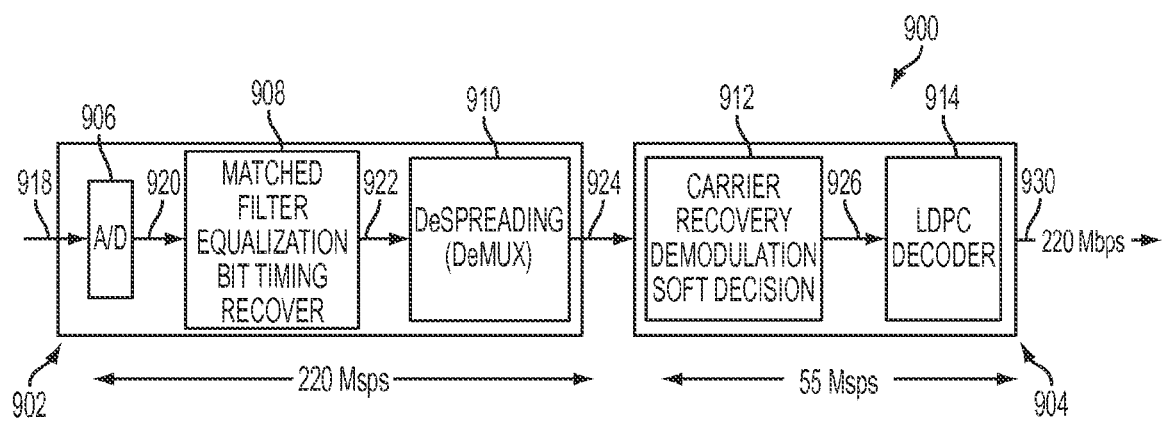
FIG. 9 illustrates a block diagram of a receiver for receiving a CDM multiplexed data stream, in accordance with an exemplary embodiment.

FIG. 9 illustrates an example CDM receiver, in accordance with an aspect of the present invention. A CDM receiver 900 includes a faster operational portion 902 and a slower operational portion 904. CDM receiver 900 may receive and process a CDM modulated signal and deliver a recovered signal. Non-limiting examples of processing includes ADC, matched filter equalization, bit timing recovery, de-spreading, carrier recovery, demodulation, soft decision, LDPC decoding and post processing. CDM receiver 900 may receive and process signals as described with reference to FIG. 7 and as transmitted by receiver 800 as described with reference to FIG. 8. Faster operational portion 902 may receive and process a CDM modulated signal and deliver a de-spreaded signal. Slower operational portion 904 may receive a de-spreaded signal from faster operational portion 902 and deliver a recovered signal. Faster operational portion 902 includes an ADC 906, a filter 908 and a de-multiplexer 910.

ADC 906 may receive an analog signal 918 and output a digitized signal 920. Filter 908 is arranged to output a filtered signal 922 based on digitized signal 920. In some embodiments, filter 908 is arranged to receive digitized signal 920 directly from ADC 906. De-multiplexer 910 is arranged to output a de-spreaded signal 924 based on filtered signal 922. In some embodiments, de-multiplexer 910 is arranged to receive filtered signal 922 directly from filter 908. ADC 906 may perform conversion of a received analog signal 918 to digitized signal 920. ADC 906 may operate in a similar manner as ADC 502 discussed above with reference to FIG. 5. Filter 908 may process digitized signal 920 received from ADC 906. Non-limiting examples of processing performed by filter 908 include matched filtering, equalization and bit timing recovery. Filter 908 may optimize the signal-to-noise ratio of a received signal. De-multiplexer 910 may perform de-spreading of received filtered signal 922 and deliver de-spreaded signal 924.

Slower operational portion 904 includes a demodulator 912 and a LDPC decoder 914. Demodulator 912 is arranged to output a signal 926 based de-spreaded signal 924. In some embodiments, demodulator 912 is arranged to receive de-spreaded signal 924 directly from de-multiplexer 910. LDPC decoder 914 is arranged to output a recovered signal 930 based on demodulated signal 926. In some embodiments, LDPC decoder 914 is arranged to receive demodulated signal 926 directly from demodulator 912. Demodulator 912 may process de-spreaded signal 924 received from de-multiplexer 910 and deliver demodulated signal 926. Non-limiting examples of processing performed by demodulator 912 include carrier recovery, demodulation and soft decision. LDPC decoder 914 may receive demodulated signal 926 from demodulator 912 and perform LDPC decoding. LDPC decoder 914 may operate in a similar manner to LDPC decoder 510 as discussed above with reference to FIG. 5.

CDM receiver 900 may receive analog signal 918 encoded and modulated as described with reference to example CDM codeblock 700 of FIG. 7. Analog signal 918 may be processed at a faster operational speed by faster operational portion 902. Faster operational portion 902 may deliver a digitized, filtered and de-spread signal denoted as de- spreaded signal 924. Slower operational portion 904 may receive de-spreaded signal 924 and perform demodulation and decoding of de-spreaded signal 924 for delivery of recovered information via recovered signal 930. Outroute 702 may illustrate an example of recovered information.

For purposes of discussion, presume that analog signal 918 corresponds to the combination of outroutes 702, 704, 706 and 708, which corresponds to analog signal 252 as provided by transmitter 800. Further, presume that CDM receiver 900 is configured to retrieve data within outroute stream signal 226, which in this example corresponds to outroute 704. In this example, the processing of analog signal 918 is performed at an increased rate by faster operational portion 902. Now, presume that de-spreaded signal 924 corresponds to modulated signal 242 and presume that modulated signal 242 corresponds to outroute 704. In such a case, slower operational portion 904 only be required to demodulate and decode the portions of analog signal 252 that corresponds to modulated signal 242. Therefore, slower operational portion 904 may operate at a reduced rate. Furthermore, operation at a reduced rate reduces cost, complexity, semiconductor real-estate and power consumption.

Figure 10:
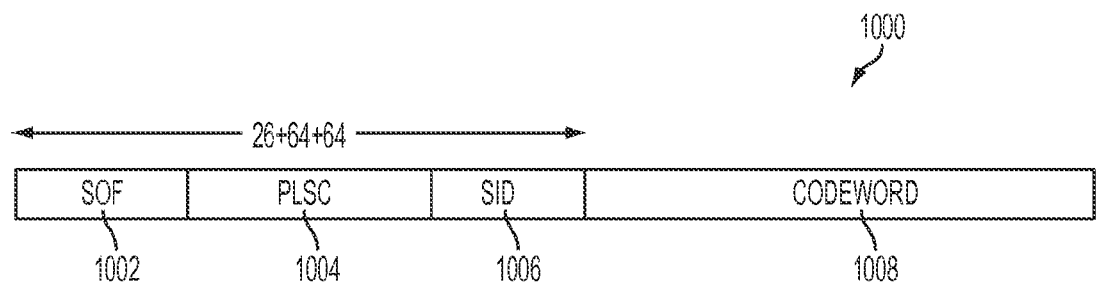
FIG. 10 illustrates an example codeblock frame, in accordance with an exemplary embodiment.

FIG. 10 illustrates an example codeblock frame 1000, in accordance with an aspect of the present invention. A codeblock frame 1000 includes, a start of frame (SOF) 1002, a physical layer signaling code (PLSC) 1004, a stream identifier (SID) 1006 and a codeword 1008. SOF 1002 may be arranged at the beginning of the example codeblock frame 1000. PLSC 1004 may be arranged to follow SOF 1002 in the frame structure of example codeblock frame 1000. SID 1006 may be to follow PLSC 1004 and prior to codeword 1008 in example codeblock frame 1000. Codeword 1008 may be arranged at the end of example codeblock frame 1000. SOF 1002 may be configured as a 26 bit sub-frame for identifying a start of the frame. PLSC 1004 may be configured as a 64 bit sub-frame for performance of physical layer signal coding. The coding may be a portion of example codeblock frame 1000 and may be transmitted or received during communication between a transmitter and a receiver. SID 1006 may be configured as a 64 bit Stream identifier for identifying a stream at a receiving station. SID 1006 may be intended to be received by a station that receives frames corresponding to a SID match. SID 1006 may also inform the receiver what the modulation scheme of the codeblock. Codeword 1008 contains the original information, wherein the information is coded bits.

In operation, outroute signals, described with reference to FIG. 2C, may be formed into a frame structure with building blocks SOF 1002, PLSC 1004, SID 1006 and codeword 1008. A codeblock may be configured as a first level framing structure containing synchronization and signaling information as described with reference to FIG. 4 and FIG. 7.

In accordance with an aspect of the present invention, an example stream format for a generic continuous stream will now be described in greater detail with reference to FIG. 11. Generic Stream Encapsulation (GSE) protocol may enable efficient encapsulation of internet protocol (IP) and other network layer packets over a generic physical layer. Encapsulated data may be transported over GSE packet streams. GSE encapsulation relies on the physical layer being able to perform error detection.

Figure 11:
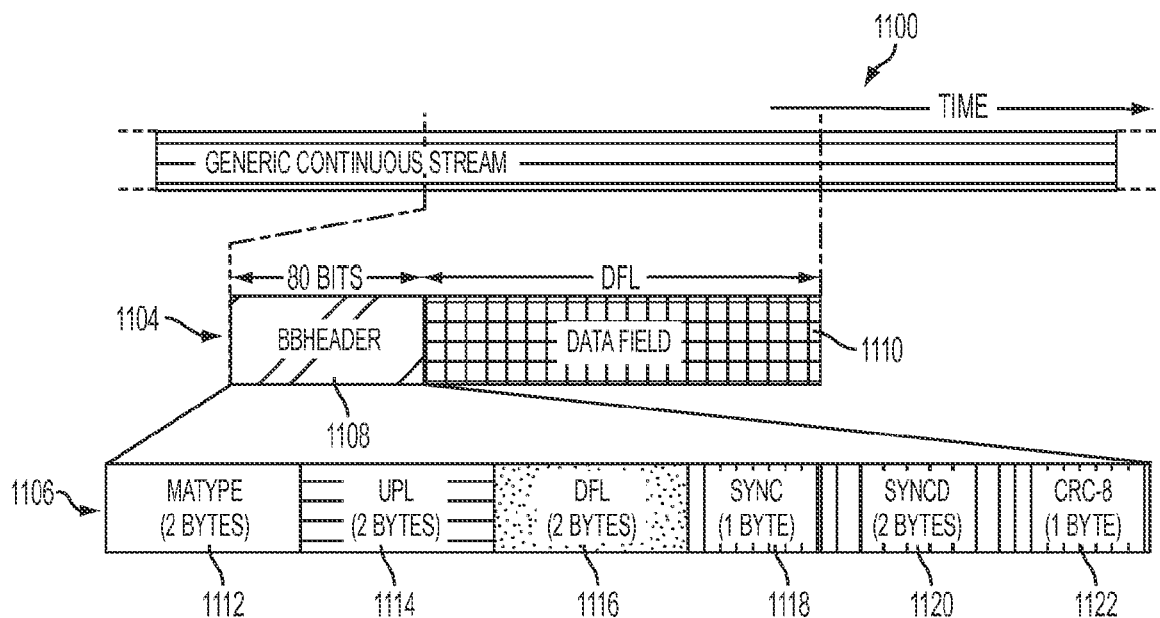
FIG. 11 illustrates the baseband header fields of a DVB-S2 codeblock, in accordance with an exemplary embodiment.

FIG. 11 illustrates an example stream in accordance with an aspect of the present invention. A stream 1100 includes a multiplicity of frames with a sampling denoted as a frame 1104. Stream 1100 may be used for communication between a transmitter and a receiver (e.g. transmitter 200 of FIG. 2C, receiver 500 of FIG. 5, receiver 600 of FIG. 6, transmitter 800 of FIG. 8 and CDM receiver 900 of FIG. 9. Frame 1104 includes a sub frame base band header (BBHEADER) 1108 and a data field (DATAFIELD) 1110. BBHEADER 1108 includes a subframe 1106, subdivided further into smaller frames, such as, a transport stream input (MATYPE) 1112, a user packet length (UPL) 1114, a data field length (DFL) 1116, a synchronization bit (SYNC) 1118, a distance from the beginning of a datafield (SYNCD) 1120 and a cyclic redundancy check bit (CRC-8) 1122. BBHEADER 1108 and DATAFIELD 1110 may be arranged within stream 1100. MATYPE 1112, UPL 1114, DFL 1116, SYNC 1118, SYNCD 1120 and CRC-8 may be arranged within BBHEADER 1108.

Stream 1100 may be configured as an outroute stream with a multiplicity of codeblocks multiplexed into a single stream using either TDM or CDM multiplexing methods. Frame 1104 may be configured as a packet format within stream 1100 delivering BBHEADER 1108 and DATAFIELD 1110. MATYPE 1112 may be configured as a portion of subframe 1106, comprising a 2-byte packet operating as a transport stream input. UPL 1114 may be configured as a portion of subframe 1106, a 2-byte packet functioning as a user packet length for stream 1100.

DFL 1116 may be arranged within BBHEADER 1108. DFL 1116 may provide user data field length and prevent the packet from becoming fragmented during the transport process. SYNC 1118 may be arranged within BBHEADER 1108. SYNC 1118 may provide a synchronization bit to BBHEADER 1108 for providing frame synchronization. SYNCD 1120 may be arranged within BBHEADER 1108. SYNCD may provide a value indicating distance in bits from the beginning of DATAFIELD 1110 to the end DATAFIELD 1110. CRC-8 1122 may be arranged within BBHEADER 1108. CRC-8 1122 may provide an error detection code applied to the first 9 bytes of BBHEADER 1108.

In operation, stream 1100 includes a multiplicity of frames 1104 with a variable length. Encapsulated IP packet data may be transported using GSE streams. Each GSE packet may be composed of GSE header followed by GSE payload reference as DATAFIELD 1110. BBHEADER 1108 may be composed of MAYTYPE, UPL, DFL, SYNC SYNCD and CRC-8 as described with reference to FIG. 11. Variable lengths for frame 1104 may prevent information from being transported via packets and, as a result, some of the unused bits in BBHEADER 1108 may be used for de- multiplexing codeblocks.

In accordance with an aspect of the present invention, a receiver may determine which codeblocks should be demodulated and decoded from the entire received stream of codeblocks based on a timeplan. The timeplan indicates the position of each of the codeblocks within the stream of codeblocks or superframe, and the corresponding terminal or receiver class that is configured or intended to decode each respective codeblock. For example, according to one exemplary embodiment, a predetermined and fixed timeplan may be specified for a respective downlink carrier, and all terminals or receivers monitoring that carrier would follow the timeplan. Such a scheme, however, is relatively inflexible and inefficient in terms of bandwidth utilization. The inflexibility arises from the fact that the timeplan is fixed, and modification of the timeplan for a carrier would require a reconfiguration of each of the terminals monitoring that carrier. The inefficiency arises from the fact that, for a given timeplan (e.g., taking into account a worst case scenario of bandwidth allocation), the timeplan may be applicable to only a small percentage of the operation time, and thus, at times when an allocation is not being fully utilized by a terminal, the unutilized bandwidth may be wasted.

According to a further exemplary embodiment, however, the timeplan may be dynamic in that it can be modified essentially at any given time. In such an embodiment, the timeplan is periodically transmitted (e.g., on a broadcast channel), and each terminal periodically acquires the timeplan to synchronize with the then current multiplexing scheme (e.g., the current assignment of codeblock positions to a respective terminal or receiver class). Accordingly, this scheme provides considerable flexibility, such as the ability to dynamically allocate the bandwidth of a particular downlink carrier to the different terminal classes. Such flexibility, however, comes at the cost of some overhead in transmitting the timeplan every super frame (albeit, a very small loss of bandwidth). In this case, the carrier is already acquired, so the timeplan can be read from the decoding of the codeblock within which the timeplan is carried, however, there is an increase in overhead associated with transmitting the timeplan in every superframe. According to the present specification and accompanying drawings, while the timeplan is described and illustrated with respect to various exemplary embodiments, the timeplan is not limited only to such described and illustrated embodiments. It will, however, be evident to one of ordinary skill in the art that various modifications may be made thereto, and additional embodiments may be implemented, without departing from the broader scope of the invention as set forth in the claims that follow.

Figure 12:
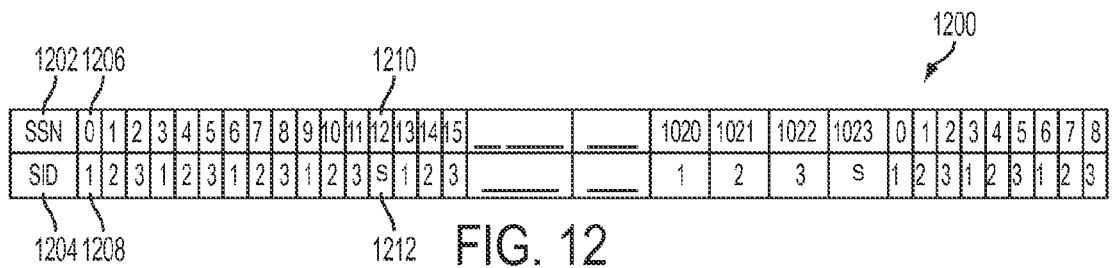
FIG. 12 illustrates an example timeplan, in accordance with an exemplary embodiment.

FIG. 12 illustrates an example timeplan in accordance with an aspect of the present invention. A timeplan 1200 includes a stream sequence number (SSN) 1202 and a stream identifier SID 1204. An element of SSN 1202 may be arranged with a corresponding SID 1204 within timeplan 1200. Essentially, the timeplan comprises an ordered list of SSNs and corresponding SIDs. Each SSN reflects a respective codeblock position within a superframe, numbered sequentially to reflect the sequential codeblocks of the superframe. For example, the SSNs for a superframe of 1024 codeblocks will be sequentially numbered from 0 to 1023. Each SID reflects a stream ID indicating the receiver or terminal classes that are intended to receive and decode the codeblock located at the position within the superframe corresponding to the respective SSN. Timeplan 1200 may be communicated via codeblock 402 (FIG. 4). The codeblock location for transmission of the timeplan 1200 may repeatedly be transmitted via the same codeblock. In other words, according to an exemplary embodiment, the timeplan is transmitted once within every superframe, and is consistently transmitted in the same respective position within each superframe (e.g., at the first position corresponding to SSN "0"). Further, in an exemplary embodiment, the timeplan is transmitted on a broadcast channel, on which a terminal may acquire various types of system information, such as configuration information and the like. The broadcast channel is intended to be decoded by the universe of terminals serviced by the particular carrier.

In an example embodiment, SSN 1202 may be configured as a 10-bit counter from 0 to 1023 within timeplan 1200 for assigning sequence number to codeblocks. SID 1204 may be configured for indicating a portion of a stream for reception by a receiving terminal and a portion of a stream for reception by the universe of receiving terminals. An outroute is a combination of substreams, where multiple outroutes may be transmitted over a single channel or satellite transponder (e.g., to a spot beam). In other words, according to an exemplary embodiment, a specific timeplan covers the multiplexing scheme for all the terminals within a downlink beam (e.g., receiving transmissions from one downlink transmission carrier—such as, in a high bandwidth satellite with upwards of 250 MHz carriers). Accordingly, a timeplan is transmitted for every such channel. Furthermore, in an example embodiment, timeplan 1200 is transmitted periodically, for example, once every 1024 codeblocks.

In operation, timeplan 1200 may be configured as a sequence of SSN 1202 with a corresponding SID 1204 and may be broadcast to all receivers within a system. For purposes of discussion, presume that transmitter 200 of FIG. 2C transmits analog signal 252 to four different receivers, wherein the four different receivers are constructed so as to demodulate and process one of outroute stream signal 224, outroute stream signal 226, outroute stream signal 228 and outroute stream signal 230 respectively. In such a case each of the four receivers will receive the entire analog signal 252, which includes timeplan 1200.

Furthermore, a receiver attempting to acquire information via an outroute carrier would receive timeplan 1200 within a predetermined period of time. A receiver may receive and decode timeplan 1200 to determine which portions or codeblocks of a stream are associated with the receiver. At that point, the receiver would then decode the stream that carries the SID and SSN information. Reception and decoding of timeplan 1200 by a receiver may occur periodically as necessary. Following reception of an initial timeplan 1200, a determination of operating on a different outroute may be realized, after which a receiver may switch to the correct outroute. Following a switch to a new channel, a receiver may receive and decode a new timeplan 1200 corresponding to the new outroute.

For example, a sequence number 1206 may have a value of "0," indicating the first transmission for SSN 1202 and SID 1204. Furthermore, an identifier 1208 may have a value of "1," indicating the first portion of a codeblock may be received by receiver "1." Similarly, a sequence number 1210 may have a value of "12" indicating the twelfth transmission for SSN 1202 and SID 1204. Further, an identifier 1212 may have a value of "S" indicating that the twelfth portion of a codeblock may be received by the universe of receivers.

In other words, an SSN 1206 may have a value of "0," indicating the time of transmission of the first codeblock of the respective superframe. Furthermore, the SID 1208, corresponding to the SSN 1206, may have a value of "1," indicating that the first portion or codeblock of the superframe should be decoded by receivers or terminals configured or classified for codeblocks of SID values of "1." Similarly, an SSN 1210 may have a value of "12," indicating the time of transmission of the thirteenth codeblock of the respective superframe. Further, an SID 1212, corresponding to the SSN 1210, may have a value of "S," identifying a shared or broadcast transmission in thirteenth portion or codeblock of the superframe, which should be decoded by the universe of receivers following the respective timeplan.

Accordingly, once a receiver or terminal is synchronized with the data stream, and has acquired the appropriate timeplan, the receiver follows the SIDs of the timeplan, and decodes only the corresponding portions or codeblocks of the superframe for the SIDs that match the SIDs for which the terminal is configured or classified. Based on a timeplan, therefore, the bandwidth of each superframe can be allocated amongst the classes of terminals based on the number of codeblocks of a superframe allocated to each terminal class or SID. Moreover, certain classes of terminals, which process the data streams at faster rates, can be allocated further bandwidth by assigning multiple SID values to the particular terminal class (e.g., at a minimum, a terminal may be assigned 2 SIDs—one specific SID and the shared or broadcast SID—and a faster terminal may be assigned multiple SIDs—such as a specific SID and one or more SIDs for a multicast community). According to one embodiment, however, a constraint may exist in that the bandwidth allocation to a given terminal class should not exceed the decode rate capabilities of the terminal receiver (e.g., if a terminal receiver decodes at a rate of one of every four codeblocks, then the codeblock allocation should not exceed an assignment of more than one codeblock of every four consecutive codeblocks to that specific terminal class). According to other exemplary embodiments, however, one of skill in the art would recognize that a scheme may be implemented to, for example, buffer codeblocks and allow a terminal to catch up in the event that the bandwidth allocation to a terminal exceeds the decode rate of the terminal for a short duration of time. Additionally, the bandwidth allocation may be dynamically updated by updating the timeplan at any given time.

Further, a single SID, however, may, for example, be shared with many thousands of terminals, and thus, only a relatively low percentage of codeblocks designated (based on an SID) for a class of terminals may be relevant to any given terminal in that class. Accordingly, once a terminal determines that a codeblock is to be decoded by that terminal (based on the SID), for example, the terminal after decoding may determine whether data within the codeblock is in fact addressed to that terminal based on a higher layer protocol, such as the media access control (MAC) layer (e.g., based on a MAC ID) (where such higher layer protocol is independent of the embodiments of the present invention, and would be known to and understood by one of ordinary skill in the art).

Accordingly, exemplary embodiments provide a system in which multiple different point-to-point, multicast and broadcast traffic streams can be encoded and multiplexed onto a common modulated carrier. Further, each terminal can be configured or designated to decode and process one or multiple of those streams. Moreover, in such a system, sizes of the streams can be dynamically varied based on offered load, priorities, and other policies, up to the modulated carrier symbol rate. Such dynamic variation can be accomplished with a timeplan in accordance with exemplary embodiments, transmitted in a broadcast stream indicating the stream size configuration for a given epoch. The system may also include a gateway that dynamically manages relative stream sizes such that each terminal or class of terminals is not overloaded by the receipt and processing of aggregate bandwidth beyond the capabilities of the terminal or class of terminals. The timeplan according to exemplary embodiments can be used to assign broadcast or multicast streams in accordance with communities of interest, such that a given terminal processes only that broadcast or multicast application traffic to which the terminal is subscribed or which the terminal is designated or configured to receive.

Additionally, in such a system, point-to-point streams may also be used to enable independent service providers to communicate with their separate subscribers, while making maximal use of common wholesaler infrastructure and bandwidth. The satellite operator can act as a wholesaler for its infrastructure and bandwidth, whereby the multiplexing scheme allows the wholesaler to sell these assets to various independent service providers. Then, utilizing the multiplexing scheme of exemplary embodiments of the present invention (as herein described), the independent service providers can dynamically manage bandwidth to their customers. For example, the satellite operator can assign various SIDs of the timeplan amongst service provider clients. Each service provider client can then divide its assets (i.e., SIDs) into point to point and/or multicast SIDs, based on depending on user or customer communities of interest. The multiplexing scheme would thereby provide each service provider with the capability to independently and dynamically allocate the amount of stream size based on offered load, priorities, and other policies.

Figure 13:
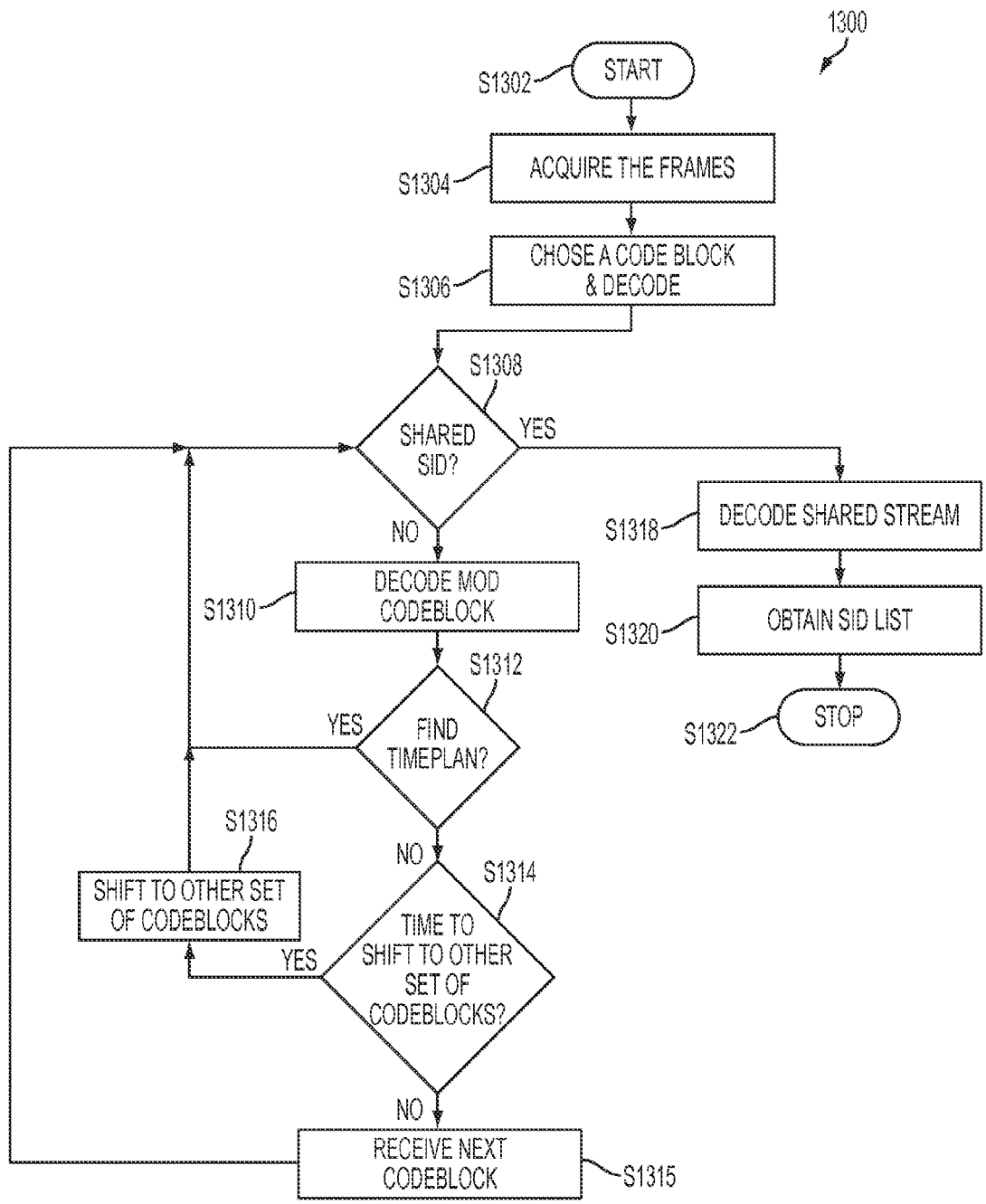
FIG. 13 illustrates a flow chart of a method for acquisition of a timeplan in a multiplexing scheme employed with a continuous GSE protocol, in accordance with an exemplary embodiment.

FIG. 13 illustrates an example method 1300 for timeplan acquisition, in accordance with an exemplary embodiment of the present invention. Initially, for example, on power-up, a terminal synchronizes with a data stream in accordance with the normal synchronization process of the DVB-S2 Standard, for example, based on the physical layer header (PL-HEADER). Then the timeplan acquisition method, for example, according to the exemplary embodiment of the method 1300 starts (S1302), and the frames may be acquired (S1304). Receiver 500 of FIG. 5, receiver 600 of FIG. 6 or CDM receiver 900 of FIG. 9 may begin receiving a stream of information as denoted by stream 1100 of FIG. 11. For purposes of simplifying the discussion, presume that receiver 500 is used. Furthermore, receiver 500 may perform frame synchronization for determining the start of frame 1104. Still further, receiver 500 may receive and process received frames (e.g. frame 1104). Receiver 500 may then select a codeblock for processing (S1306). For purposes of discussion, presume that receiver 500 selects the first codeblock for processing. The selection of codeblock to process may be performed via de-multiplexer 506.

It may then be determined whether the selected codeblock has a shared SID "S" (S1308). For example, SID 1006 of FIG. 10 may be decoded by post processor 528. Decoded SID 1006 may indicate whether the received information may be communicated to a particular receiver as illustrated by identifier 1208 of FIG. 12 or the universe of terminals as illustrated by identifier 1212. If it is determined that the selected codeblock does not have a shared SID (S1308), then the receiver may receive and decode a codeblock from a different portion of frame 1104 of FIG. 11 (S1310). For example, receiver 500 may then select another codeblock for processing. At this point it may be determined whether the newly selected codeblock includes a timeplan (S1312). If so, then it is again determined whether the newly selected codeblock has a shared SID (S1308).

If the selected codeblock does not include a timeplan (S1312), then a determination for shifting to an alternate set of codeblocks may be determined (S1314). For example, once receiver 500 has received and decoded a timeplan, receiver 500 may determine the proper codeblocks to receive and process. If it is determined that it is not time to shift to an alternate set of codeblocks, then another codeblock may be received (S1315) followed by a determination of shared SID (S1308). In an example embodiment, a first set of codeblocks may have even SSN, whereas the other set may have odd SSN. If the shared SID is not found in the first set of codeblocks, it will be found in the next set of codeblocks. If it is determined that it is time to switch to an alternate set of codeblocks (S1314), then the sequence of codeblocks may be switched to the alternate set and a codeblock from the alternate set may be received (S1316) followed by a determination of shared SID (S1308).

Once it is determined that there is a shared SID (S1308), the shared stream may be decoded (S1318). At that point, the SID list may be generated (S1320). A shared SID contains information to be shared by all substreams. One type of shared information that may be in a shared SID is the timeplan. In an example embodiment, a timeplan is transmitted once in a superframe (e.g., a frame of 1024 codeblocks corresponding to SSNs 0-1023), many of which may be shared SIDs. As such, when the SID list is generated, the shared SIDs are searched for the timeplan. Receiver 500 may determine portions of the codeblock associated with receiver 500 as described with reference to FIG. 2C. For example, presume for the sake of discussion that receiver 500 corresponds to SID 1 within timeplan 1200 of FIG. 12. Accordingly, receiver 500 would then decode SSNs having an SID 1 associated therewith. Returning to FIG. 5, post processor 528 would then instruct de-multiplexer 506, via data signal 526, to only pass the codeblocks corresponding to the SSNs associated with the SID 1 of timeplan 1200.

Once a receiver has acquired the timeplan and determined portions associated with receiver, execution of method 1300 may terminate (S1322).

In other words, according to an exemplary embodiment, once synchronized to the frame, the receiver can begin the process of acquiring the timeplan, beginning with acquisition of the data stream or the frames. The receiver then selects an arbitrary codeblock to decode, and determines whether the codeblock is a shared or broadcast codeblock, or a codeblock directed at a particular class of terminals, based on the SID. The SID and SSN of a particular codeblock, for example, can be coded into the baseband header (BBHEADER) of the codeblock (e.g., utilizing unused bits of the header, such as unused bits of the MATYPE or SYNCD headers), as described in further detail below. If the codeblock is a shared codeblock, then the receiver determines whether the codeblock contains the timeplan. For example, the timeplan may be determined through upper layer mechanics that can identify the timeplan based on certain information, such as IP headers (where such mechanisms are independent of the embodiments of the present invention, and would be known to and understood by one of ordinary skill in the art). If the receiver determines that the codeblock is not a shared codeblock or doesn't contain the timeplan, then the receiver moves on and decodes the next codeblock.

For example, based on the processing rate of the terminal, the receiver may be able to decode two of every four codeblocks, in which case, the receiver will decode every other codeblock (e.g., either the odd or even SSN codeblocks). For this example, say the receiver is decoding the even codeblocks, and the superframe contains 1024 codeblocks. If the receiver runs through all 512 even codeblocks, and does not locate the timeplan, the receiver will then shift to the odd SSN codeblocks (S1314), and repeat the process until the receiver acquires the timeplan. For example, in one embodiment, the receiver can track the number of codeblocks accessed based on a counter. Then, for a superframe of 1024 codeblocks, a 10 bit counter can track the progress by either incrementing by 2 for every codeblock accessed, and the receiver can detect the time to shift to odd SSNs when the counter reaches 1024, or by incrementing by 1 for each codeblock accessed, and the receiver can detect the time to shift when the counter reaches 512. Accordingly, in the example of the receiver running at a rate of decoding two of every four codeblocks, worst case, the receiver will acquire the codeblock within two superframes, where the timeplan is located at the same codeblock position in each superframe. Similarly, for example, with a receiver running at a rate of decoding one of every four codeblocks, worst case, the receiver will acquire the timeplan within four superframes. Additionally, as specified above, according to the embodiment where the timeplan is transmitted once within every superframe, if a new terminal comes on line, then that terminal will not have to wait an extended period to acquire the timeplan, as it is transmitted every superframe, an there will then be a worst case depending only on the receiver decode rate. Alternatively, in a further exemplary embodiment, the timeplan may be transmitted periodically skipping a number of superframes (e.g., transmitted every N superframes), except in such cases, the longer the period between timeplan transmissions (e.g., the larger the value of N), the longer it may tale to acquire or update the timeplan.

Accordingly, the acquisition method 1300, for acquiring the timeplan represents a totally flexible scheme, where the timeplan may be transmitted within any codeblock of the superframe, without the receiver having any knowledge of the SSN position wherein the timeframe resides.

Figure 14:
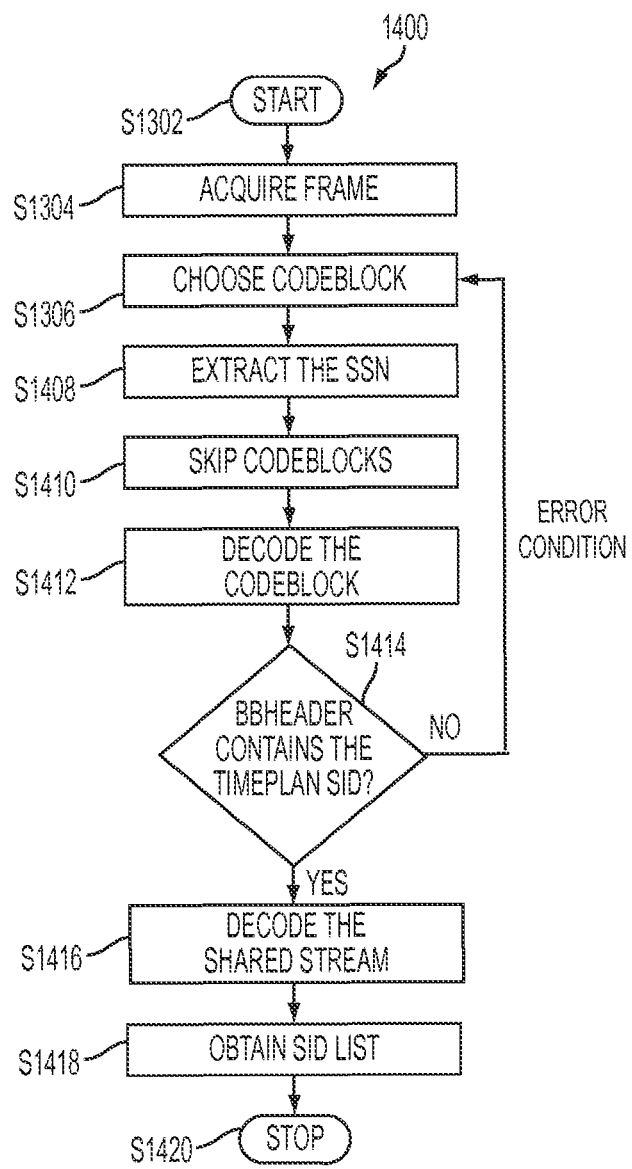
FIG. 14 illustrates a flow chart of a method for acquisition of a timeplan in a multiplexing scheme employed with a continuous GSE protocol, in accordance with further an exemplary embodiment.

FIG. 14 illustrates an example method 1400 of timeplan acquisition, in accordance with a further exemplary embodiment of the present invention. This method presents a simplified method for timeplan acquisition requiring less processing for timeplan acquisition as compared to method 1300. Again, initially, for example, on power-up, a terminal synchronizes with a data stream in accordance with the normal synchronization process of the DVB-S2 Standard, for example, based on the PLHEADER. The beginning of method 1400 is similar to method 1300 discussed above with reference to FIG. 13. In particular, the timeplan acquisition method, for example, according to the exemplary embodiment of the method 1400 starts (S1302), frames are acquired (S1304) and an arbitrary codeblock is selected (S1306).

At this point method 1400 differs from method 1300. According to this embodiment, the SSN is extracted from the selected codeblock (S1408). As specified above, for example, the SID and SSN of a particular codeblock can be coded into the BBHEADER of the codeblock, as described in further detail below. Based upon on the extracted SSN, the receiver may skip codeblocks to advance to the position of the timeplan (S1410). For example, in the situation where the timeplan is transmitted in the first codeblock of the superframe (SSN "0"), based on the extracted SSN, the receiver can determine how many codeblocks to skip before the first position of the next superframe is reached (e.g., if the extracted SSN is "1000," then the next 23 codeblocks can be skipped before reaching the first codeblock of the next superframe). Once the first codeblock of the next superframe is decoded, it is then determined whether the accessed codeblock has the shared SID "0" (S1414). For example, for purposes of discussion, presume that SID 1006 of FIG. 10 is decoded. Decoded SID 1006 may indicate whether the received information may be communicated to a particular receiver (for example as illustrated by identifier 1208 of FIG. 12) or to all the receivers (for example as illustrated by identifier 1212). If it is determined that the accessed codeblock does not have the shared SID "0," then an error condition is determined, and a new codeblock is chosen (S1306). Alternatively, if it is determined that the accessed codeblock does have the shared SID, then the codeblock may be decoded to obtain the timeplan (S1416 and S1418).

Once the receiver has acquired the timeplan and thereby determined positions of the codeblocks, directed to the SID of that terminal, within the superframes of the data stream, method 1400 stops (S1420).

Accordingly, the acquisition method 1400, for acquiring the timeplan represents a less flexible scheme, where the receiver requires prior knowledge of the SSN position wherein the timeplan resides (e.g., within the codeblock of the first position of a superframe—SSN="0"). At the same time, however, the method 1400 represents a scheme whereby the timeplan may be acquired in a significantly quicker fashion, in that the receiver can determine the exact number of codeblocks to skip to reach the codeblock wherein the timeplan resides, and, worst case, the receiver need only wait one superframe before acquiring the timeplan (e.g., if the first codeblock acquired by the receiver is the next codeblock after the timeplan—then the receiver must skip the next 1023 codeblocks).

Figure 15:
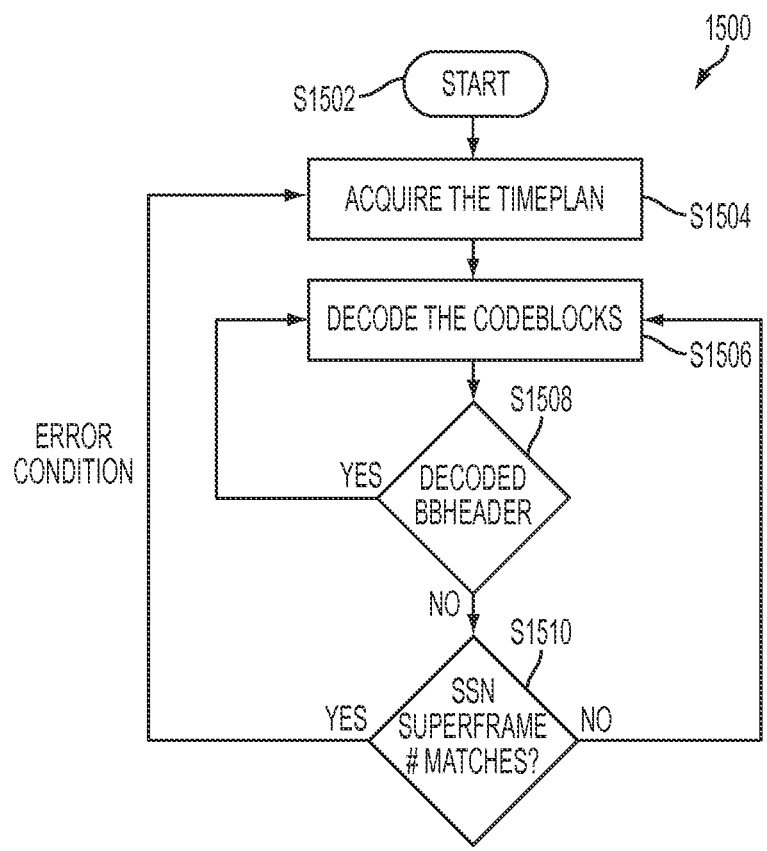
FIG. 15 illustrates an example method of new timeplan activation or a timeplan update, in accordance with further an exemplary embodiment.

FIG. 15 illustrates an example method of timeplan acquisition following powering up of a receiver, in accordance with an aspect of the present invention. A method 1500 starts (S1502) and timeplan 1200 of FIG. 12 may be acquired. Following powering up of a receiver, timeplan 1200 may be acquired in a similar manner as discussed above with referenced to FIG. 13 or FIG. 14. Received codeblocks may be decoded (S1506). A receiver may receive and decode codeblocks as discussed previously with reference to FIGS. 3-11. A determination as to whether received codeblocks correspond to correct codeblocks associated with timeplan 1200 may be performed (S1508). For a determination of not receiving codeblocks associated with timeplan 1200 (S1508), a receiver may skip codeblocks until receiving a codeblock associated with timeplan 1200 (S1510). A receiver may ignore or disregard information received not associated with timeplan 1200. Following power-up, a received timeplan 1200 may not correspond with received information and a receiver may skip received information until received information corresponds with timeplan 1200. For example, a timeplan may be modified synchronous with a receiver powering up and the received timeplan may be associated with information to be received at a later point in time. In other words, since the timeplan change takes 2 super frames to become active as explained in FIG. 24, there is a possibility that at power up a terminal has acquired the new timeplan but that timeplan does not become active until two superframes later (albeit this possibility is very low). Thus when the terminal uses this new timeplan to decode it may not correctly receive data for the next two superframes, until this timeplan becomes active. FIG. 15 shows a method of fly wheeling through the next two super frames. After fly wheeling through two super frames the received data does not match the acquired timeplan then it is an error condition and the receiver goes to reacquiring the timeplan.

According to a further embodiment, signaling for identification of the SSN and SID for each codeblock may be implemented using the baseband header (BBHEADER) 1104 of a codeblock (as depicted in FIG. 11). The DVB-S2 Standard addresses both Broadcast and Interactive modes of operation. The Broadcast mode uses a packetized protocol, consisting of either packetized multi-protocol encapsulation (MPE) or packetized generic stream encapsulation (GSE). The Interactive mode can use either the packetized MPE or GSE protocol or continuous GSE protocol. The continuous GSE protocol is more efficient than the packetized modes, however, in order to support both the Broadcast and Interactive modes of the DVB-S2 Standard, a system must support both the packetized and continuous protocols. In accordance with the present invention, therefore, exemplary embodiments provide a multiplexing system and scheme that supports either the Broadcast or Interactive modes using packetized MPE/GSE protocols.

Figure 16:
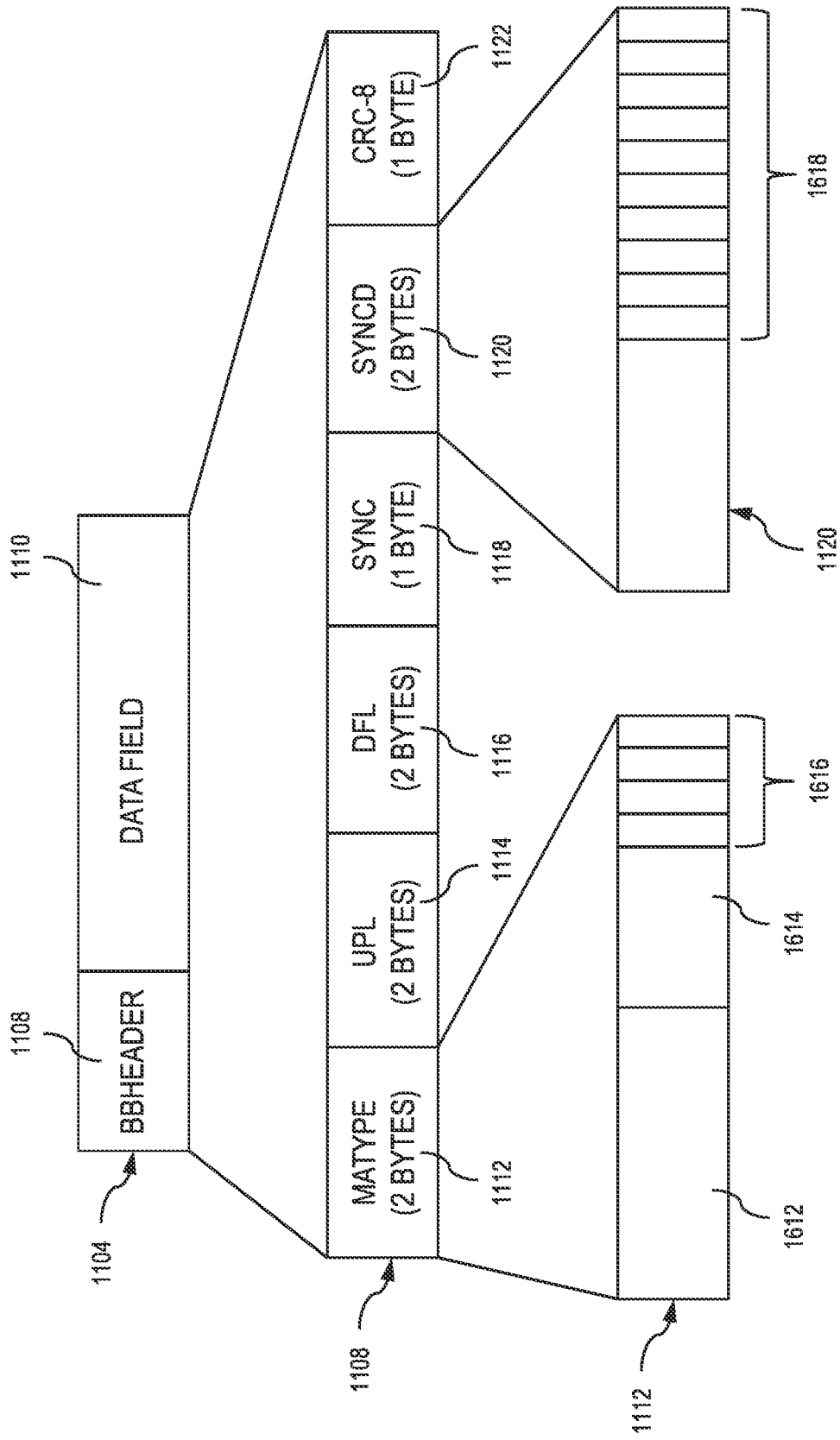
FIG. 16 illustrates the signaling within a codeblock baseband header, for a multiplexing scheme employed with a continuous GSE protocol, in accordance with an exemplary embodiment.

With reference to FIG. 16, when operating in an interactive or IP mode employing the continuous GSE protocol, certain portions of the BBHEADER are inapplicable or unused (e.g., certain bits of the MATYPE field of the BBHEADER, and certain bits of the SYNCD field of the BBHEADER). According to one exemplary embodiment, therefore, such bits may be used to identify the SID and SSN for the respective codeblock. For example, as shown in FIG. 16 a certain number of bits of the MATYPE field 1112 (e.g., the first and second bytes of the MATYPE field may be referred to as the MATYPE-1 field 1612 and MATYPE-2 field 1614, respectively) may be used to identify the SID 1616 (e.g., with 4 bits, 16 different SID classes can be defined, including one shared or broadcast SID). Also, a certain number of bits of the SYNCD field can be used to identify the SSN 1618 (e.g., 10 bits of the SYNCD field can reflect 1024 SSNs for identifying 1024 codeblocks of a superframe). These examples of header bits utilized to identify the SID 1616 and SSN 1618 of a codeblock are only examples, and, as would be recognized by one of skill in the art, different header bits may be utilized. For example, depending on the current mode of operation other unused header bits may be utilized to identify the SID 1616 and SSN 1618 of a codeblock. Further, different numbers of bits may be utilized to identify each of the SID 1616 and SSN 1618 of a codeblock, which in turn would result in different respective numbers of terminal or receiver SID classes and SSN numbers (numbers of codeblocks per superframe).

Figure 17:
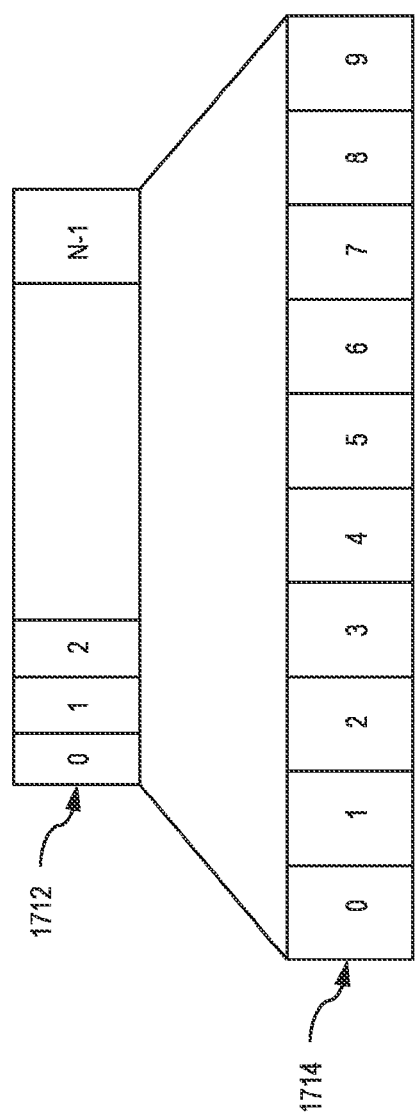
FIG. 17 illustrates an example of a counter for tracking codeblocks of a multiplexing scheme, in accordance with an exemplary embodiment.

Moreover, using an N-bit counter 1712 (FIG. 17), where N corresponds to the number of bits necessary to signify the number of SSNs for the number of codeblocks of a superframe (e.g., a ten bit counter 1714 for a superframe of 1024 codeblocks), the receiver can track the sequential codeblocks, and hence the SSNs, of the superframe, separate from the explicit specification of the SSN (e.g., via the SYNCD field of the header). Accordingly, at any given time, the receiver can verify synchronization with the timeplan by checking a given SSN extracted from the codeblock header at a given point in time against the counter. If, at any time, the extracted SSN fails to match the counter, the terminal can implement a recovery process to reestablish synchronization.

Additionally, according to another exemplary embodiment, the number of bits utilized for the SSN 1618, and thus the resulting number of codeblocks per superframe, may also be dynamically configurable. In such a case, for example, the system may reconfigure the number of codeblocks per superframe by providing updated configuration information to the terminals over the broadcast channel, which changes the number of codeblocks per superframe by changing the number of header bits that specify the SSN 1618.

According to a further exemplary embodiment, when operating in a broadcast mode, for example, employing the packetized MPE or packetized GSE protocol, again certain portions of the BBHEADER are inapplicable or unused (e.g., certain bits of the MATYPE field of the BBHEADER). Accordingly, such bits may be used to identify the SID and SSN for the respective codeblock. In accordance with such packetized protocols, however, different bits are unused as compared to the continuous GSE protocol, and, in fact fewer bits are available. A problem, therefore, exists in achieving an equivalent level of flexibility and efficiency, as is achieved with the continuous GSE protocol (as described above), with the fewer number of bits available in the BBHEADER. According to the packetized MPE/GSE protocol, for example, only one byte (8-bits) within the BBHEADER of each codeblock is available (e.g., one byte of the MATYPE 1112 field of the header, specifically, for example, the MATYPE-2 field 1614).

According to a further exemplary embodiment, therefore, a method is provided for achieving such flexibility and efficiency with the fewer number of bits available in the BBHEADER. In this embodiment, with reference to FIG. 18, five of the eight bits of the MATYPE-2 field of the header of a codeblock are utilized to specify the SID and the SSN for the codeblock. The SID may be explicitly coded and the SSN may be implicitly coded. For example, as with the continuous protocol (as described above), a certain number of the available bits of the header may be used to identify the SID 1616 (e.g., again, with 4 bits, 16 different SID classes can be defined, including one shared or broadcast SID). In this case, however, instead of explicitly providing the SSN (e.g., 1618 OF FIG. 16) via a certain number of header bits that result in a corresponding number of SSNs, and hence codeblocks per frame, the SSN is implicitly coded into the header using, for example, only one bit. According to this embodiment, one bit of the MATYPE-2 field 1614 of the header is utilized to provide a superframe flag for the implemented multiplexing scheme (the multiplexing superframe flag or MSF 1812). The MSF 1812 signals the start of each superframe, and from that, using an N-bit counter, where N corresponds to the number of bits necessary to signify the number of SSNs for the number of codeblocks of a superframe (e.g., a ten bit counter for a superframe of 1024 codeblocks), the receiver can track the sequential codeblocks, and hence the SSNs, of the superframe.

Figure 19:
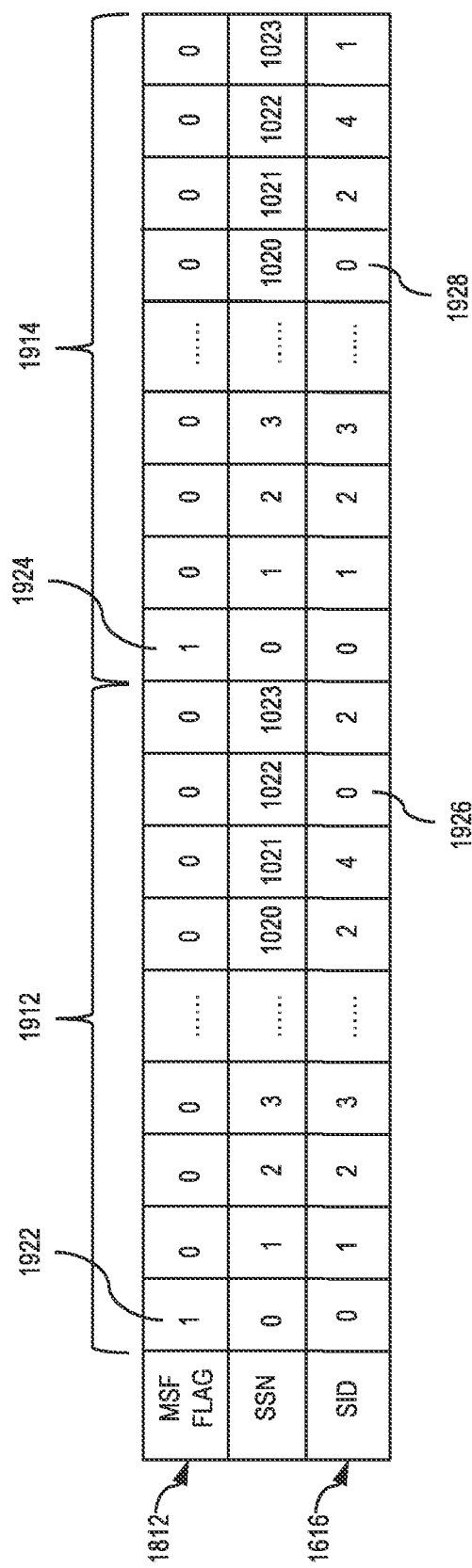
FIG. 19 illustrates an example of the signaling, for a multiplexing scheme employed with a packetized MPE or packetized GSE protocol, where the SID is explicitly coded and the SSN is implicitly coded within the header of a codeblock, in accordance with an exemplary embodiment.

More specifically, when operating in a broadcast mode (e.g., employing the packetized MPE or packetized GSE protocol), FIG. 19 illustrates the signaling for such a multiplexing scheme, where the SID 1616 is explicitly coded using 4 bits of the MATYPE-2 header field, and the SSN is implicitly coded using 1 bit of the MATYPE-2 header field for the MSF 1812. In FIG. 19, it should be noted that the SSN is not explicitly coded in the codeblocks, but is shown here to illustrate the codeblock SSN position within the superframe, and as may be tracked by the terminal via the counter 1714. The MSF 1812 and SID 1616 are associated with two 1024 codeblock superframes, the first corresponding to SSNs 0-1023 (1912) and the second corresponding to SSNs 0-1023 1914). The "1" value 1922 of the MSF signals the first codeblock of the first superframe (SSN="0"), and the "1" value 1924 of the MSF signals the first codeblock of the second superframe (SSN="0"). Further, the "1" values of the MSF signal an SSN of "0," whereby a receiver is able to synchronize its SSN counter to "0," and the receiver can increment the counter with every codeblock, and thereby provide an explicit SSN to the terminal. Also, as specified above, the SIDs reflect the terminal classes intended to decode the codeblocks at the positions of the respective SSNs, where the SIDs of value "0" signify broadcast codeblocks intended to be decoded by the universe of terminals on the respective carrier. Moreover, as depicted, there may be "0" SIDs reflecting broadcast codeblocks that do not contain the timeplan (e.g., SIDs 1926 and 1928). The timeplan is signaled as being contained in only the codeblocks at the first position of a superframe (corresponding to the MSF="1," the SSN="0" and the SID="0").

Figure 20:
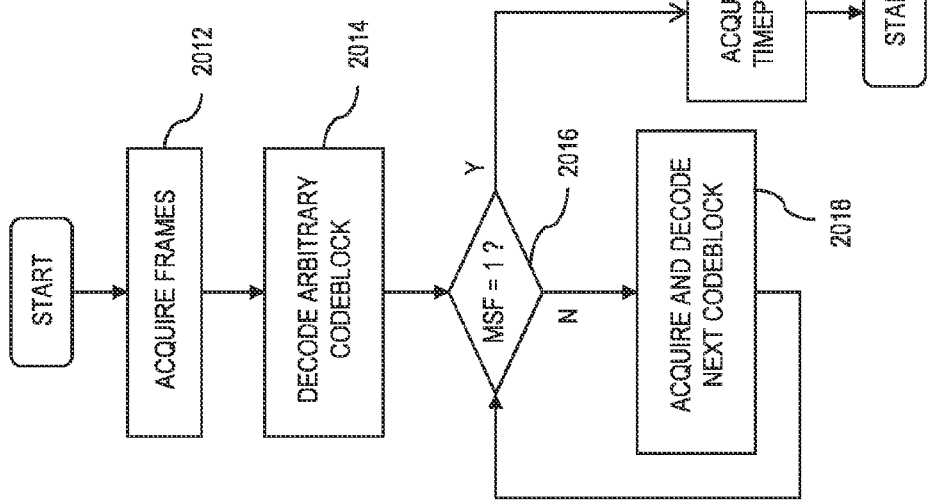
FIG. 20 illustrates a flow chart of a method for acquisition of a timeplan in a multiplexing scheme employed with a packetized MPE or packetized GSE protocol, in accordance with an exemplary embodiment.

Further, with respect to acquisition of the timeplan, in the case where the timeplan is transmitted in the first codeblock position (SSN="0") of every superframe, FIG. 20 reflects a method for acquiring the timeplan using the MSF 1812. The method starts, as with the method of FIG. 13, by acquiring the frames and choosing and decoding an arbitrary codeblock (S2012 and S2014). At step S2016, the receiver determines whether the MSF="1." If the MSF is not "1," the receiver acquires and decodes the next codeblock (based on its decode rate)(S2018), and returns to step 52016. If the MSF="1," then the receiver acquires the timeplan from the data field of the codeblock (S2020). Once the receiver identifies the first codeblock of a superframe based on a "1" value of the MSF, the receiver knows that the respective codeblock contains the timeplan. Alternatively, in a case where the timeplan is not located in the first codeblock of each superframe, with respect to the timeplan acquisition method of FIG. 13, while searching for the timeplan in every decoded codeblock, the receiver can concurrently determine the MSF value of each codeblock, and, once an MSF value of "1" is determined (signaling the first codeblock of the next superframe), the receiver can synchronize its counter to coincide with the SSNs.

In this embodiment, however, the use of the one bit MSF, however, raises issues with respect to timeplan acquisition for slower rate terminals. For example, referring back to the timeplan acquisition method of FIG. 13, based on the code rate, the receiver decodes a codeblock at a regular interval (e.g., in the case of the 2/4 code rate, the receiver decodes every other codeblock, and in the case of a 1/4 code rate, the receiver decodes every fourth codeblock). Again, therefore, for a 2/4 code rate receiver, the terminal may have to wait two whole superframes before acquiring the timeplan, and for a 1/4 code rate receiver, the terminal may have to wait four whole superframes before acquiring the timeplan. For a slower code rate terminal, such as with a 1/16 code rate receiver, the terminal decodes every sixteenth codeblock, and thus, worst case, that terminal may have to wait 16 superframes before acquiring the timeplan. Moreover, with respect to the timeplan acquisition method of FIG. 14, when the receiver decodes any given codeblock, because with this protocol the SSN is not expressly coded in the codeblock header, the receiver may have no knowledge of the SSN or position of the codeblock. So, when acquiring and decoding the initial code block, the receiver would have no way of determining (based on the SSN) how many codeblocks would be required to be skipped to reach the beginning of the next superframe (e.g., in the case where the timeplan would be contained in the codeblock of the first position of each new superframe).

Figure 18:
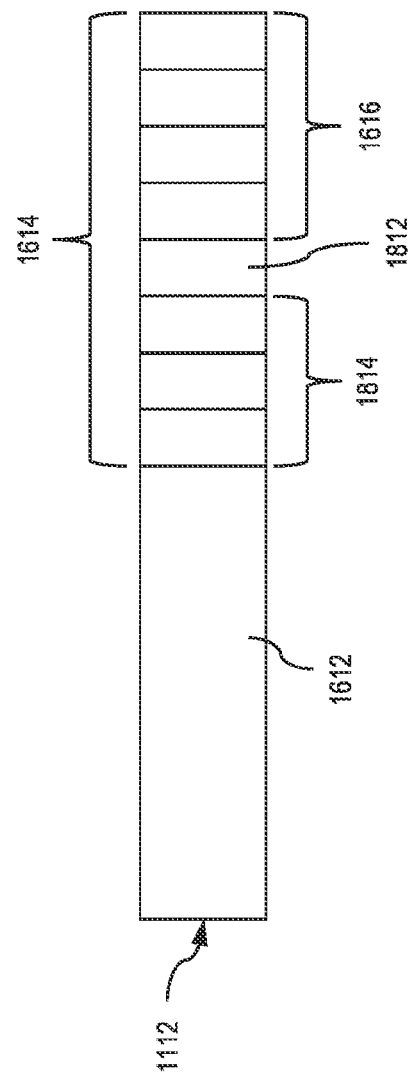
FIG. 18 illustrates the signaling within a codeblock baseband header, for a multiplexing scheme employed with a packetized MPE or packetized GSE protocol, in accordance with an exemplary embodiment.

Accordingly, based on a further exemplary embodiment, an indicator 1814 is provided as to a number of codeblocks that may be skipped (e.g., as depicted in FIG. 18). According to this embodiment, the indicated number of codeblocks that may be skipped is not necessarily the number required to reach the beginning of the next superframe, but rather a number of codeblocks that can be skipped based on a number of bits available for the indicator 1814. For example, as depicted in FIG. 18, in the foregoing case where the SID 1616 is coded by four bits of the available header byte (MATYPE-2), and the MSF 1812 uses one bit, an additional three bits is left for the indicator 1814. With reference to FIG. 22, the indicator provides the three least significant bits of the SSN, and thereby provides an indication of where the current codeblock is located, within a group of 8 SSNs or codeblocks (e.g., SSN XXXXXXX000 to SSN XXXXXXX111). As with FIG. 19, it again should be noted that, in FIG. 22, the SSN is not explicitly coded in the codeblocks, but is shown to illustrate the codeblock SSN position within the superframe, and as may be tracked by the terminal via the counter 1714. The MSF 1812 and SID 1616 are associated with two 1024 codeblock superframes, the first corresponding to SSNs 0-1023 (2216) and the second corresponding to SSNs 0-1023 2218).

Accordingly, based on these least significant three bits of the SSN, the receiver can determine the number of codeblocks required to be skipped to reach the first codeblock of the next group of 8 codeblocks. For example, starting with 2212, where the indicator bits="3," the receiver determines that it must skip the next four codeblocks to reach the first codeblock of the next group of eight codeblocks (indicator bits="0" 2214). Then, from there, the receiver would know that it can successively skip the next seven codeblocks to reach the first codeblock of each successive group of eight codeblocks. In that manner, once the first codeblock (the indicator 1814 bits="0") of a current group of eight codeblocks is determined, the receiver would be required to only decode one out of every successive eight codeblocks until it acquires the timeplan at the first codeblock of the next superframe (e.g., again, where the timeplan would be contained in the codeblock of the first position of each new superframe). Additionally, while decoding one of every successive group of eight codeblocks (the $0^{th}$ SSN of each particular group of eight codeblocks), concurrently, the receiver can be looking for an MSF flag value of "1" to locate the first codeblock of the next superframe. Hence reducing processing and power requirements for the terminal.

Figure 21:
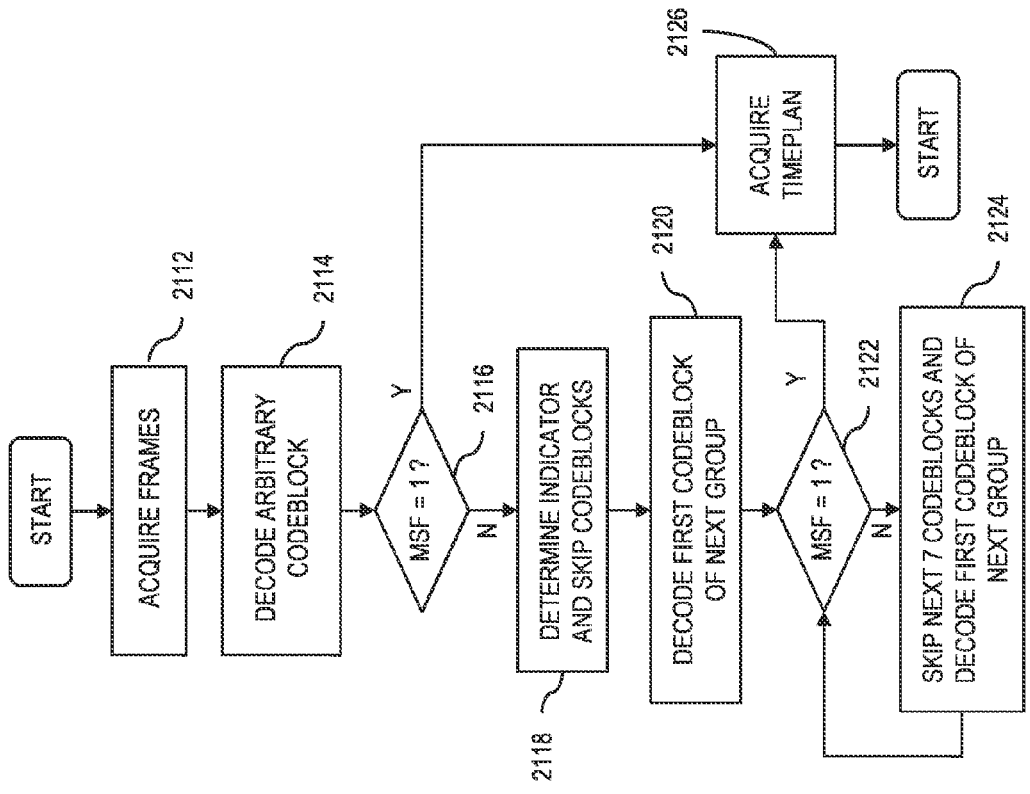
FIG. 21 illustrates a flow chart of a method for acquisition of a timeplan in a multiplexing scheme employed with a packetized MPE or packetized GSE protocol, in accordance with a further exemplary embodiment.

Based on this indicator 1814 and the MSF 1812, a method for acquiring the timeplan is illustrated in FIG. 21. Again, the process begins with the acquisition of the frames and choosing and decoding an arbitrary codeblock (S2112 and S2114), and a determination as to whether the MSF="1" (S2116). If the MSF is not "1," then the receiver determines the indicator 1814, and based on the indicator, determines the number of codeblocks to skip to reach the first codeblock of the next group of 8 codeblocks (S2118). The receiver then decodes the codeblock at the first position of the next group of 8 codeblocks (S2120). Again, the receiver determines whether the MSF="1" (S2122). If the MSF is not "1," then the receiver skips the next 7 codeblocks, and decodes the codeblock at the first position of the next group of 8 codeblocks (S2124), and returns to step S2122. If, at either of steps S2116 or S2122, the MSF="1," then the receiver acquires the timeplan from the data field of the codeblock (S2126).

Figure 23:
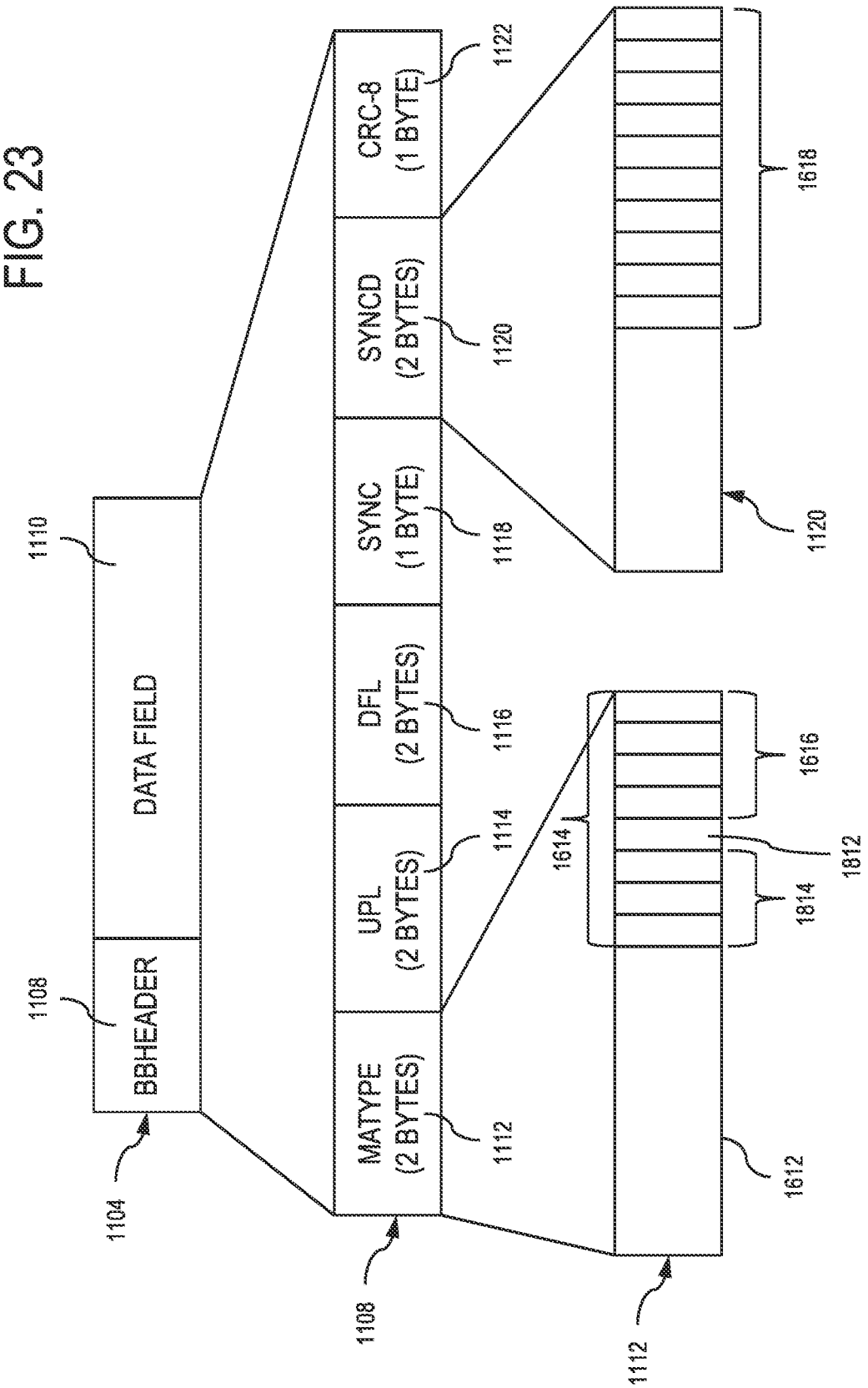
FIG. 23 illustrates an example of the signaling, for a multiplexing scheme employed with a continuous GSE protocol, where the SID is explicitly coded, the SSN is implicitly coded and an SSN indicator is coded within the header of a codeblock, in accordance with an exemplary embodiment.

Additionally, according to a further exemplary embodiment, in the interactive mode, when utilizing the continuous GSE protocol, where the SID 1616 and SSN 1618 are both explicitly signaled, as depicted in FIG. 16. According to this embodiment, however, although the SID and SSN are both explicitly signaled, the MSF 1812 and indicator 1814 may also be signaled, as depicted in FIG. 23. In this manner, uniformity can be maintained between the broadcast modes of FIGS. 18, 20 and 21.

Figure 24:
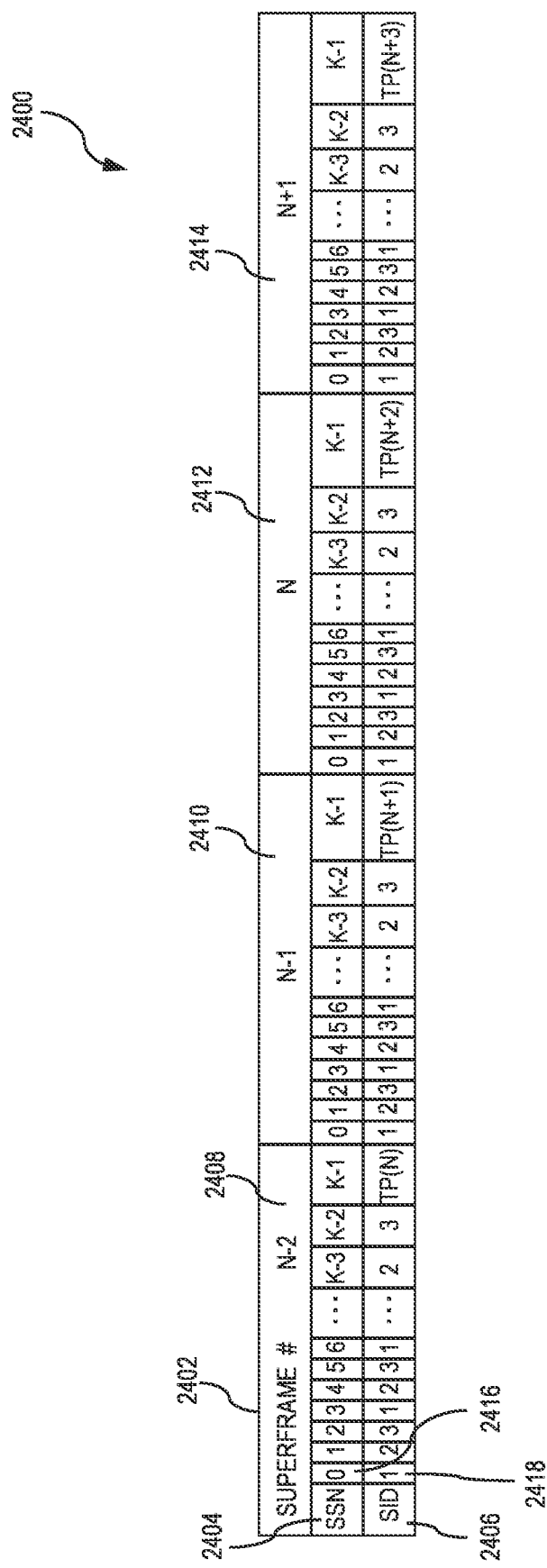
FIG. 24 illustrates an arrangement of a plurality of superframes, in accordance with further an exemplary embodiment.

FIG. 24 illustrates an arrangement 2400 of a plurality of superframes, in accordance with an aspect of the present invention. Arrangement 2400 of a plurality of superframes includes a row 2402 of superframes, a row 2404 of SSNs and a row 2406 of SIDs. Row 2402 includes N−2 superframe 2408, N−1 superframe 2410, N superframe 2412, and N+1 superframe 2414, where TP(N) is the timeplan for superframe N. Row 2404 lists the SSNs within each superframe, whereas row 2406 lists the SIDs within each superframe. Superframe 2408 includes a plurality of frames with a sampling sequence number 0 (SSN 0) denoted as 2416 presented with an SID having a value "1," as indicated by 2418. Sequence number 2416 may perform the same function as SSN 1202 discussed above with reference to FIG. 12. SID 2418 may perform the same function as SID 1204 discussed above with reference to FIG. 12.

Due to de-multiplexing of codeblocks as described with reference to FIGS. 3-9, updating a timeplan for a receiver may require several codeblocks to perform. As a result of requiring several codeblocks for updating a timeplan, synchronization of timeplans with received information may be performed by transmitting updated timeplan information prior to implementation of the updated timeplan. Furthermore, timeplan 1200 (FIG. 12) may be communicated via a codeblock, for example a shared codeblock. The codeblock location for transmission of timeplan 1200 with respect to a superframe, for example superframe 2408, may repeatedly be transmitted via the same codeblock, for example outroute codeblock 402 (FIG. 4). For example, a system seeking to update a receiver timeplan during frame x may begin transmitting updated timeplan information during the transmission of frame x-2, or two frames prior to implementation of the new timeplan. Prior to frame x, a receiver may continue to operate based upon the timeplan transmitted prior to frame x-2. Furthermore, once a timeplan has been transmitted to a receiver, the receiver may operate based on the updated timeplan (e.g. frame x).

In accordance with aspects of the present invention, a plurality of outroute data streams may be multiplexed at the transmitter side, thereby achieving multiple times greater data capacity than existing transmitters. Similarly, a received multiplexed data stream may be demultiplexed at the receiver side in order to achieve greater data capacity. The timeplan according to exemplary embodiments: provides a flexible means of providing a multiplexing scheme to allow terminals to operate on wideband signals without requiring the decoder to operate at full speed; provides multiple SIDs that a terminal could decode, allowing the transmission of broadcast and system information only once to all terminals; provides the ability to provide differentiated services and to provide multicast streams depending on communities of interest; provides a configurable R/S multiplexing scheme, rather than a fixed 1/S scheme; provides the ability for multiclass terminal operation, whereby terminals with faster decoder rates could decode multiple SIDs assigned to it, whereas slower terminals decode only the shared and a single SID—which would not be possible with a traditional fixed 1/N multiplexing scheme; provides for scaling of the amount of shared channel capacity depending on the needs of the system, rather than proving a fixed 1/N throughput; and provides for system-wide, dynamic modification of the multiplexing scheme through dynamic updates of the timeplans—e.g., different timeplans depending on the time of day traffic requirements.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
    receiving, by a receive processing device of a communications terminal, a multiplexed data stream comprising a plurality of codeblocks multiplexed onto the multiplexed data stream and organized within one or more respective superframes within the data stream, wherein the codeblocks respectively reflect data symbols of multiple respective encoded and modulated source data streams of multiple respective data sources;
    decoding a one codeblock of the plurality of codeblocks of the multiplexed datastream, wherein each codeblock includes a flag that indicates whether the codeblock contains a timeplan, and wherein the timeplan includes a respective sequence number identifying a position of each of the codeblocks within the respective superframe and includes a respective class indicator identifying a communication device class that is designated to decode the respective codeblock; and
    determining whether the flag of the one codeblock indicates that the one codeblock contains the timeplan; and
    when it is determined that the one codeblock contains the timeplan, the method further comprises acquiring the timeplan.

2. A method according to claim 1, further comprising:
    in response to a determination that the one codeblock does not contain the timeplan, determining a first subsequent codeblock of the plurality of codeblocks;

decoding, by the processing device, the first subsequent codeblock; and determining whether the flag of the first subsequent codeblock indicates that the first subsequent codeblock contains the timeplan; and if it is determined that the first subsequent codeblock contains the timeplan, the method further comprises acquiring the timeplan.

3. A method according to claim 2, wherein, each codeblock further includes a sequence number indicator that indicates a sequence position of the one code block within a first group of the plurality of code blocks, and the determination of the first subsequent codeblock is based on one or more of a decode rate of the processing device and the sequence number indicator.

4. A method according to claim 3, wherein each codeblock further includes a class indicator indicating a communication device class that is designated to decode the code block.

5. A method according to claim 4, wherein each codeblock further includes a sequence number specifying a sequence position of the codeblock within a superframe of the multiplexed datastream.

6. A method according to claim 3, wherein, the first group comprises a number of code blocks based on a number of bits of the sequence number indicator, and the determination of the first subsequent codeblock comprises skipping, based on the sequence number indicator, to a first codeblock of a second group of code blocks, wherein the second group comprises a number of codeblocks equal to the number of codeblocks of the first group.

7. A method according to claim 6, further comprising:

in response to a determination that the first subsequent codeblock does not contain the timeplan, determining a second subsequent codeblock of the of the plurality of codeblocks, wherein the determination of the second subsequent codeblock comprises skipping, based on the number of code blocks of the second group, to a first code block of a third group of codeblocks;

decoding, by the processing device, the second subsequent codeblock; and determining whether the flag of the second subsequent code block indicates that the second subsequent codeblock contains the timeplan; and if it is determined that the second subsequent codeblock contains the timeplan, the method further comprises acquiring the timeplan.

8. A method according to claim 1, wherein each codeblock is associated with a sequence number signifying a sequence position of the codeblock within a superframe of the multiplexed datastream, and the flag further indicates whether the sequence number of the one codeblock signifies that the one codeblock is of a first position within the superframe, and wherein the method further comprises:

resetting a counter for tracking the sequence number of each of the codeblocks in response to a determination that the one codeblock contains the timeplan.

9. A method according to claim 1, wherein the timeplan is transmitted in at least one codeblock within each superframe.

10. A method according to claim 1, wherein the timeplan is transmitted in one codeblock within each superframe, and the codeblock containing the timeplan is of a same sequence number of each superframe.

11. A method according to claim 1, wherein the timeplan is periodically transmitted within the codeblocks of the multiplexed datastream.

12. A method according to claim 1, wherein the flag is contained within a header of each codeblock.

13. A method according to claim 1, wherein the codeblocks are formatted in accordance with a DVB-52 protocol, and the flag is contained within a baseband header of each code block.

14. An apparatus, comprising:

a receiver configured to receive a multiplexed datastream comprising a plurality of codeblocks multiplexed onto the multiplexed data stream and organized within one or more respective superframes within the data stream, wherein the codeblocks respectively reflect data symbols of multiple respective encoded and modulated source data streams of multiple respective data sources; and a processor device configured to, decode a one codeblock of the plurality of codeblocks of the multiplexed datastream, wherein each codeblock includes a flag that indicates whether the codeblock contains a timeplan, and wherein the timeplan includes a respective sequence number identifying a position of each of the codeblocks within the respective superframe and includes a respective class indicator identifying a communication device class that is designated to decode the respective codeblock, determine whether the flag of the one codeblock indicates that the one codeblock contains the timeplan, and acquire the timeplan from the one codeblock when it is determined that the one codeblock contains the timeplan.

15. An apparatus according to claim 14, wherein, in response to a determination that the one codeblock does not contain the timeplan, the processor device is further configured to:

determine a first subsequent code block of the of the plurality of code blocks;

decode the first subsequent codeblock;

determine whether the flag of the first subsequent codeblock indicates that the first subsequent codeblock contains the timeplan; and acquire the timeplan from the first subsequent codeblock if it is determined that the first subsequent codeblock contains the timeplan.

16. An apparatus according to claim 15, wherein, each codeblock further includes a sequence number indicator that indicates a sequence position of the one code block within a first group of the plurality of code blocks, and the processor device determines the first subsequent codeblock based on one or more of a decode rate of the processor device and the sequence number indicator.

17. An apparatus according to claim 16, wherein each codeblock further includes a class indicator indicating a communication device class that is designated to decode the codeblock.

18. An apparatus according to claim 17, wherein each codeblock further includes a sequence number specifying a sequence position of the code block within a superframe of the multiplexed datastream.

19. An apparatus according to claim 16, wherein, the first group comprises a number of code blocks based on a number of bits of the sequence number indicator, and the processor device determines the first subsequent codeblock by skipping, based on the sequence number indicator, to a first codeblock of a second group of code blocks, wherein the second group comprises a number of codeblocks equal to the number of codeblocks of the first group.

20. An apparatus according to claim 19, wherein, in response to a
determination that the first subsequent codeblock does not contain the timeplan, the processor device is further configured to:
determine a second subsequent codeblock of the of the plurality of code blocks, wherein the processor device determines the second subsequent code block by skipping, based on the number of codeblocks of the second group, to a first codeblock of a third group of code blocks;
decode the second subsequent codeblock;
determine whether the flag of the second subsequent codeblock indicates that the second subsequent codeblock contains the timeplan; and
acquire the timeplan from the second subsequent codeblock if it is determined that the second subsequent codeblock contains the timeplan.

21. An apparatus according to claim 14, wherein each codeblock is associated
with a sequence number signifying a sequence position of the code block within a superframe of the multiplexed datastream, and the flag further indicates whether the sequence number of the one codeblock signifies that the one codeblock is of a first position within the superframe, and
wherein the processor device is further configured to:
reset a counter for tracking the sequence number of each of the code blocks in response to a determination that the one codeblock contains the timeplan.

22. An apparatus according to claim 14, wherein the timeplan is transmitted in at least one codeblock within each superframe.

23. An apparatus according to claim 14, wherein the timeplan is transmitted in one codeblock within each superframe, and the codeblock containing the timeplan is of a same sequence number of each superframe.

24. An apparatus according to claim 14, wherein the timeplan is periodically transmitted within the codeblocks of the multiplexed datastream.

25. An apparatus according to claim 14, wherein the flag is contained within a header of each codeblock.

26. An apparatus according to claim 14, wherein the codeblocks are formatted in accordance with a DVB-52 protocol, and the flag is contained within a baseband header of each code block.

27. A communications system, comprising:
a first communications terminal comprising a transmitter section configured to,
multiplex a plurality of codeblocks into a multiplexed datastream organized within one or more respective superframes within the data stream, wherein the codeblocks respectively reflect data symbols of multiple respective encoded and modulated source data streams of multiple respective data sources, and wherein the plurality of codeblocks is multiplexed in accordance with a multiplexing structure,
insert a timeplan into the multiplexed datastream, wherein the timeplan includes a respective sequence number identifying a position of each of the codeblocks within the respective superframe and includes a respective class indicator identifying a communication device class that is designated to decode the respective codeblock, and transmit the multiplexed datastream over the communications system; and
a second communications terminal, comprising:
a receiver section configured to receive the multiplexed datastream; and
a processor device configured to decode a one codeblock of the multiplexed datastream, wherein each codeblock includes a flag that indicates whether the codeblock contains the timeplan, to determine that the flag of the one codeblock indicates that the one codeblock contains the timeplan, and to acquire the timeplan from the one codeblock.

28. A communications system according to claim 27, wherein, in response to a determination that the one codeblock does not contain the timeplan, the processor device is further configured to:
determine a first subsequent code block of the of the multiplexed datastream;
decode the first subsequent codeblock;
determine whether the flag of the first subsequent codeblock indicates that the first subsequent codeblock contains the timeplan; and
acquire the timeplan from the first subsequent codeblock if it is determined that the first subsequent codeblock contains the timeplan.

29. A communications system according to claim 28, wherein,
each codeblock further includes a sequence number indicator that indicates a sequence position of the one codeblock within a first group of the codeblocks of the multiplexed datastream, and
the processor device determines the first subsequent codeblock based on one or more of a decode rate of the processor device and the sequence number indicator.

30. A communications system according to claim 29, wherein each codeblock further includes a class indicator indicating a communications terminal class that is designated to decode the codeblock.

31. A communications system according to claim 30, wherein each codeblock further includes a sequence number specifying a sequence position of the codeblock within a superframe of the multiplexed datastream.

32. A communications system according to claim 29, wherein,
the first group comprises a number of code blocks based on a number of bits of the sequence number indicator, and
the processor device determines the first subsequent codeblock by skipping, based on the sequence number indicator, to a first codeblock of a second group of code blocks,
wherein the second group comprises a number of codeblocks equal to the number of codeblocks of the first group.

33. A communications system according to claim 32, wherein, in response to a determination that the first subsequent codeblock does not contain the timeplan, the processor device is further configured to:
determine a second subsequent codeblock of the of the plurality of code blocks, wherein the processor device determines the second subsequent code block by skipping, based on the number of codeblocks of the second group, to a first codeblock of a third group of code blocks;
decode the second subsequent codeblock;

determine whether the flag of the second subsequent codeblock indicates that the second subsequent codeblock contains the timeplan; and acquire the timeplan from the second subsequent codeblock if it is determined that the second subsequent codeblock contains the timeplan.

34. A communications system according to claim 27, wherein each codeblock is associated with a sequence number signifying a sequence position of the codeblock within a superframe of the multiplexed datastream, and the flag further indicates whether the sequence number of the one codeblock signifies that the one codeblock is of a first position within the superframe, and wherein the processor device is further configured to:

reset a counter for tracking the sequence number of each of the code blocks in response to a determination that the one codeblock contains the timeplan.

35. A communications system according to claim 27, wherein, the communications system comprises a satellite communications system, and each of the first communications terminal and the second communications terminal comprises a satellite communications terminal, the first communications terminal transmits the multiplexed datastream over a carrier of the satellite communications system, and the timeplan signifies the multiplexing structure for the second satellite communications terminal along with a plurality of further satellite communications terminals for all channels within a downlink beam of the satellite communications system.

36. A communications system according to claim 35, wherein, the codeblocks are organized within one or more superframes within the datastream, each codeblock is of a sequence number indicating a position of the codeblock within a respective superframe, and the timeplan further signifies the sequence number of each code block and a respective class indicator indicating a communications terminal class that is designated to decode the respective codeblock.

37. A communications system according to claim 36, wherein the plurality of outroute data streams comprise one or more of at least one point-to-point traffic stream, at least one multicast traffic stream and at least one broadcast traffic stream, and wherein the second communications terminal is configured to decode and process one or more of the traffic streams.

38. A communications system according to claim 36, wherein sizes of the traffic streams are dynamically varied based on offered loads, priorities and other policies, up to a modulated carrier symbol rate, wherein the time plan further signifies configurations of the traffic stream sizes.

39. A communications system according to claim 36, wherein the timeplan further signifies one or more of at least one broadcast traffic stream and at least one multicast traffic stream based on one or more of communities of interest, subscriptions and data plan allocations associated with the second communications terminal, whereby the second communications terminal processes only the traffic streams for which the terminal is designated based on the class indicators for the respective codeblocks.

40. A communications system according to claim 38, further comprising: a gateway, wherein the gateway dynamically manages the sizes of the traffic streams, whereby the second communications terminal processes only traffic streams for which the terminal is designated, and whereby an aggregate bandwidth of the traffic streams for which the terminal is designated is managed based on processing capabilities of the second communications terminal.

41. A communications system according to claim 36, wherein the timeplan is configured to facilitate the use of point-to-point streams to enable independent service providers to communicate with respective subscribers, and enhancing efficiencies in use of common infrastructure and bandwidth of the satellite communications system.

\* \* \* \* \*